US010327026B1

(12) United States Patent
Mishra

(10) Patent No.: US 10,327,026 B1
(45) Date of Patent: Jun. 18, 2019

(54) PRESENTING CONTENT-SPECIFIC VIDEO ADVERTISEMENTS UPON REQUEST

(71) Applicant: Amazon Technologies, Inc., Seattle, WA (US)

(72) Inventor: Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/668,629

(22) Filed: Aug. 3, 2017

(51) Int. Cl.
*H04N 21/23* (2011.01)
*H04N 21/2668* (2011.01)
*H04N 21/81* (2011.01)
*H04N 21/234* (2011.01)
*H04N 21/472* (2011.01)
*H04N 21/258* (2011.01)
*H04N 21/2547* (2011.01)
*H04N 21/239* (2011.01)

(52) U.S. Cl.
CPC ..... *H04N 21/2668* (2013.01); *H04N 21/2393* (2013.01); *H04N 21/23418* (2013.01); *H04N 21/23424* (2013.01); *H04N 21/2547* (2013.01); *H04N 21/25891* (2013.01); *H04N 21/47202* (2013.01); *H04N 21/812* (2013.01)

(58) Field of Classification Search
None
See application file for complete search history.

(56) References Cited

U.S. PATENT DOCUMENTS

| 5,351,075 A | 9/1994 | Herz et al. |
| 6,018,768 A | 1/2000 | Ullman et al. |
| 6,457,010 B1 | 9/2002 | Eldering et al. |
| 6,760,916 B2* | 7/2004 | Holtz ..................... G06Q 30/06 348/E5.022 |
| 7,493,636 B2 | 2/2009 | Kitsukawa et al. |
| 7,752,642 B2 | 7/2010 | Lemmons |
| 8,627,379 B2 | 1/2014 | Kokenos et al. |
| 8,949,890 B2* | 2/2015 | Evans .............. H04N 21/44204 705/14.49 |
| 2003/0028873 A1* | 2/2003 | Lemmons .......... H04N 7/17318 725/36 |
| 2008/0037951 A1 | 2/2008 | Cho et al. |
| 2010/0050202 A1 | 2/2010 | Kandekar et al. |
| 2017/0099526 A1 | 4/2017 | Hua et al. |
| 2018/0084291 A1 | 3/2018 | Wei et al. |

OTHER PUBLICATIONS https://www.facebook.com/Tengu810/timeline/2010, see portions dated 2010.

* cited by examiner

Primary Examiner — Cai Y Chen
(74) Attorney, Agent, or Firm — Athorus, PLLC

(57) ABSTRACT

Advertisements may be selected for video programming based on the visual content of the video programming. Where a video stream depicts a consumer good or service in one or more video frames, an advertisement that is consistent with the consumer good or service may be inserted into the video stream following the video frames in which the consumer good or service appears. Such an advertisement may be one of a plurality of existing advertisements, or may be prepared in a native format based on the content of the video stream, and may be seamlessly integrated into the video stream with the same or a similar setting to the video stream. A viewer of a video stream may also request one or more advertisements based on the content of the video stream.

20 Claims, 18 Drawing Sheets
(11 of 18 Drawing Sheet(s) Filed in Color)

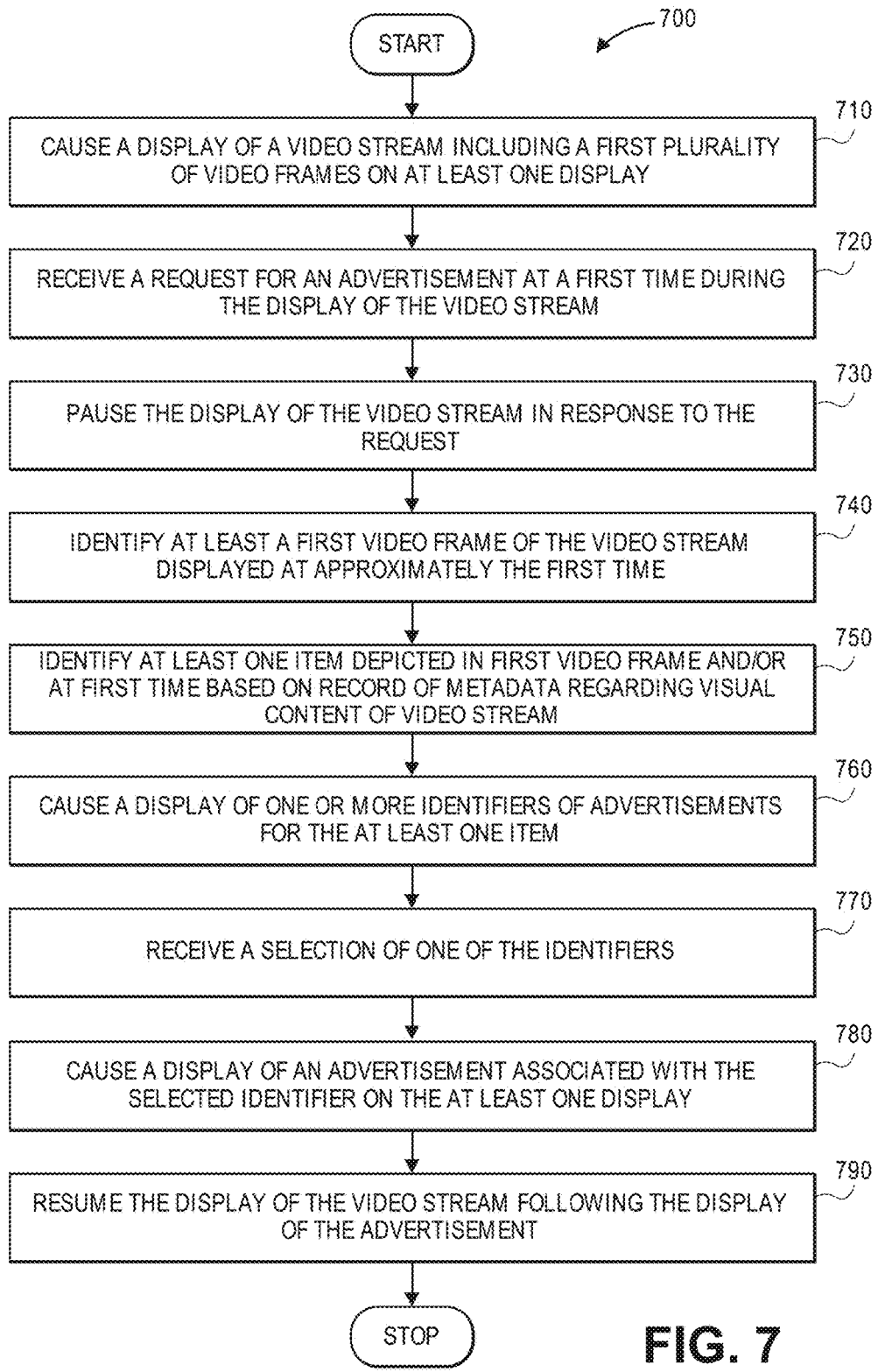

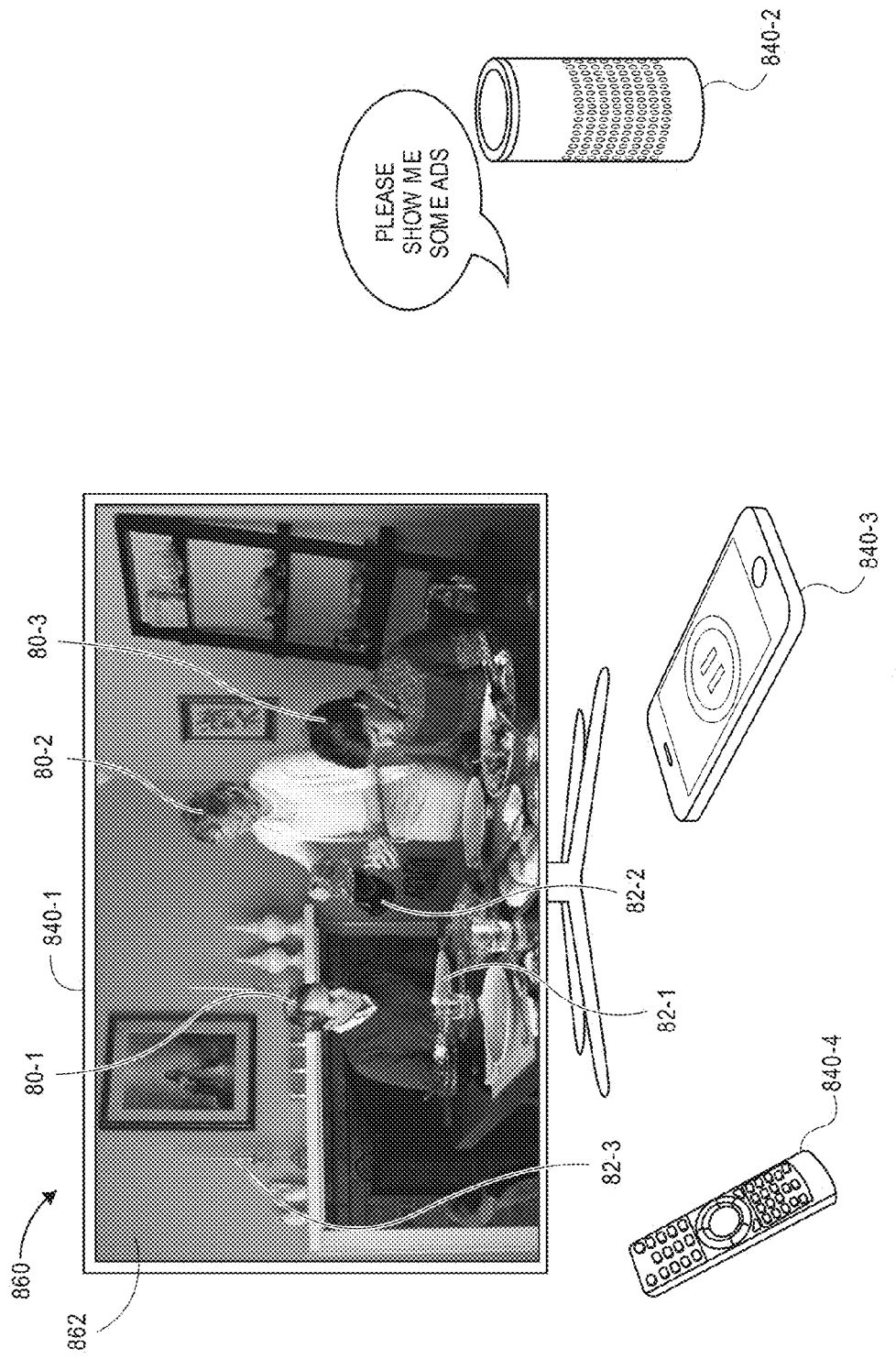

PRESENTING CONTENT-SPECIFIC VIDEO ADVERTISEMENTS UPON REQUEST

BACKGROUND

In the United States, what is now known as broadcast television began in January 1928, when two experimental television stations were founded in New York City. The first regularly scheduled television program was broadcast from a suburban Washington, D.C., station in June of that year. Thirteen years later, the television advertising industry was born when a ten-second advertisement for clocks and watches was aired prior to a game between the Brooklyn Dodgers and the Philadelphia Phillies on Jul. 1, 1941. Today, advertising on television and other video platforms is both pervasive and profitable: As of 2016, it is estimated that global revenue from television advertising alone exceeded $175 billion, and video advertising is now found in streamed video, programs stored on digital versatile discs ("DVD") or other hard formats, social networks, and nearly every other platform from which video files may be broadcasted, aired, streamed or otherwise distributed for consumption.

Currently, video advertisements, or "commercials," are frequently inserted at regular intervals into television programs. In many such programs, commercial breaks are aired every five to eight minutes, and one or more commercials for goods or services, or public service announcements, are shown to viewers during such breaks. The times of such breaks are often selected with a goal of maximizing viewer engagement with the commercials. For example, television producers and content creators often synchronize breaks with a plot of a program that is previously recorded, or with natural breaks in a live program (e.g., turnovers, timeouts, ends of innings or periods in sporting events), and air one or more commercials during such breaks. Providers of goods or services that wish to maximize their advertising reach may pay a premium to have their commercials aired during breaks in programs that are generally popular, or breaks in programs that are popular to demographics that are known or believed to be interested in one or more of their goods or services. The jockeying for position by such entities has been proven to be very lucrative to content providers: for example, a thirty-second advertisement aired during a break in Super Bowl LI cost over $5 million.

Similarly, many network sites that host streaming video services will air one or more commercials prior to streaming requested video content such as movies, documentaries or brief clips of relevant news or sports items. Such commercials may be selected at random, or based on information that may be known regarding a computer device on which the video content is to be displayed (e.g., a smartphone, a tablet, a laptop or a television), or regarding a user of the computer device, which may be determined based on an Internet Protocol address of the computer device, "cookies" stored on the computer device, or any other attributes or settings of the computer device. Alternatively, such commercials may be chosen by contract. For example, one or more local vendors may contract to have a brief commercial shown prior to video features that are aired by a network site (e.g., a web site) associated with a local newspaper, while one or more national or international business entities may contract to have brief commercials shown prior to video features that are aired by network sites associated with major news sources.

Existing methods for selecting and displaying video advertisements to viewers are occasionally plagued with a number of limitations. For example, many viewers of a television program are annoyed when a plot is broken for extended durations, in order to air one or more commercials. Such viewers commonly use these occasions to "channel surf," to obtain refreshments, to use a rest room, or to complete one or more other tasks that are unrelated to the television program that is being aired. In some instances, viewers will record a television program on a digital video recorder ("DVR") or other device or system so that they may watch the television program at a later time, and may advance ("fast-forward") through the commercials to return to the program without delay. While some advertisements are selected for display during breaks in programming based on predicted attributes of viewers who might be watching the programming, whether content of an advertisement is relevant to content of the programming is never considered. Furthermore, because video content of a commercial is typically unrelated to video content of programming being aired, a commercial must be set off from programming, e.g., by one or more transitions (such as a "fade-to-black" and a "fade-from-black"), and can never be seamlessly integrated into the actual programming. Likewise, and also because content of a commercial is typically unrelated to content of programming during which the commercial is aired, a viewer of the programming is never permitted to request an advertisement for any goods or services that are depicted in the programming. Instead, the viewer must independently research such goods or services (e.g., via one or more Internet searches) on different platforms, and either divert his or her attention from the programming, or wait for a break in the programming, to conduct such research. As is discussed above, breaks in programming occur only at times selected by a producer of the programming, and only include advertisements that the producer of the programming has chosen to air during such breaks.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 7 is a flow chart of one process for providing content-specific video advertising in accordance with embodiments of the present disclosure.

FIGS. 8A and 8B are views of aspects of one system for providing content-specific video advertising in accordance with embodiments of the present disclosure.

DETAILED DESCRIPTION

As is set forth in greater detail below, the present disclosure is directed to systems and methods for providing content-specific video advertising. More specifically, the systems and methods of the present disclosure are directed to determining attributes of the visual content of one or more video programs, and generating and inserting or appending one or more video advertisements that are specifically tailored for the attributes of the visual content and any other relevant factors into such programs. For example, where a program depicts one or more consumer goods, or includes references to one or more consumer services, an advertisement for one or more of the depicted goods or referenced services, or goods or services in a category of the depicted goods or referenced services, may be inserted or appended into the program following one or more video frames in which the goods are depicted or the services are referenced. Any type of video programming may be evaluated to determine attributes of its visual content, or modified to include one or more video advertisements based on such content, including but not limited to movies, live or previously recorded television programming, or any other video files that may be broadcasted, aired, streamed or otherwise distributed to one or more viewers. Advertisements that are inserted or appended into video programming may be stock advertisements (e.g., previously existing advertisements) that are inserted or appended near or following frames of the video programming to which the advertisement are relevant or, alternatively, native advertisements that are prepared based on one or more frames of the video programming. Moreover, a video stream may be modified to include one or more links, ties or references to advertisements for goods depicted therein, or for services referenced therein. A viewer of the video stream may request an advertisement for one or more of such goods or services, e.g., using one or more personal devices, and an advertisement may be displayed during the video stream in response to the request.

Figure 1A:
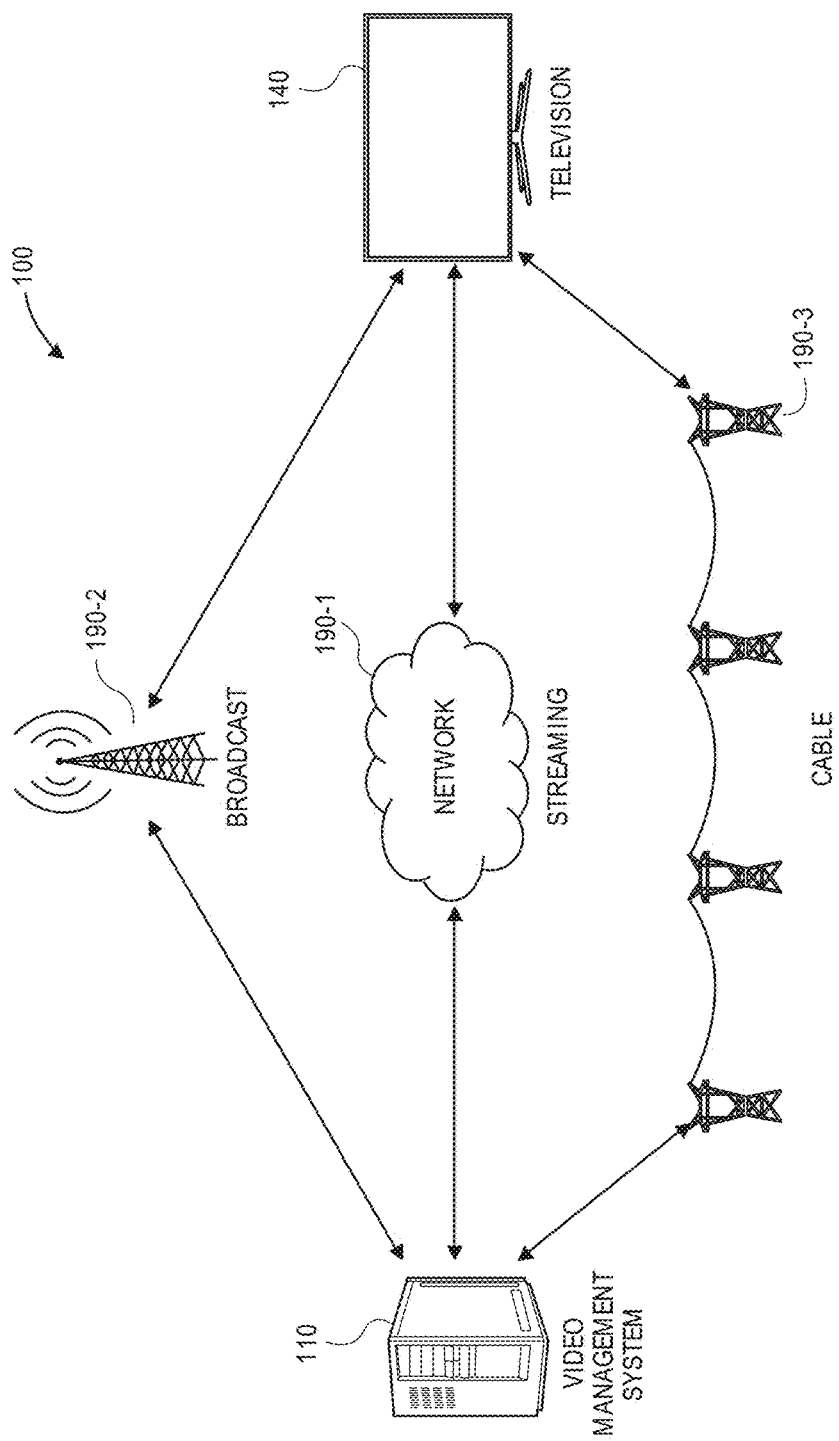
FIGS. 1A through 1F are views of aspects of one system for providing content-specific video advertising in accordance with embodiments of the present disclosure.

Referring to FIGS. 1A through 1F, views of aspects of one system 100 for providing content-specific video advertising in accordance with embodiments of the present disclosure are shown. As is shown in FIG. 1A, the system 100 includes a video management system 110 and a television 140 that may be connected to one another over a plurality of communications networks 190-1, 190-2, 190-3, including but not limited to a computer network 190-1 that may include the Internet in whole or in part, a broadcast television network 190-2 or a cable television network 190-3, as well as any other types or forms of communications networks (e.g., a cellular telephone network). The video management system 110 may be any source of video files and/or associated information, data or metadata (e.g., accompanying audio signals), or a system from which streams of such video files are made available to viewers over one or more of the networks 190-1, 190-2, 190-3. For example, the video management system 110 may be an online marketplace, an entertainment company, a video streaming service (e.g., a free service or a pay service), a cable television provider, an operator of an over-the-air television channel, a social network, an outlet for news or media of any kind, or any like individual or entity. The television 140 may be any system that is configured to display video content, and, optionally, air one or more accompanying audio signals. Alternatively, the television 140 may be one or more components of a computer system or device, e.g., a smartphone, a tablet computer, a laptop computer, or any other system or device having one or more processors and a display.

Figure 1B:
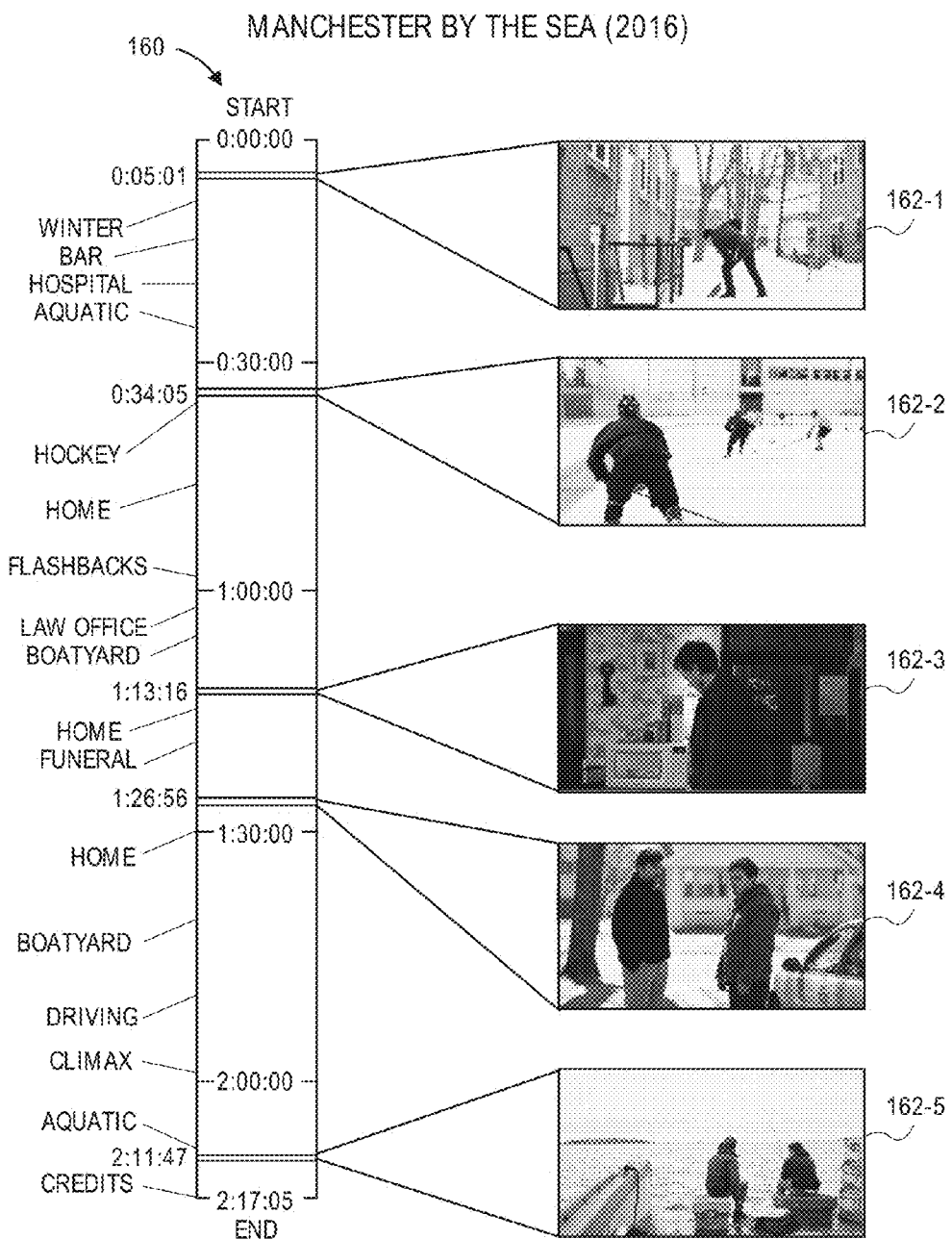

As is shown in FIG. 1B, a description of a video file 160, viz., the 2016 movie "Manchester by the Sea," is shown. The video file 160 is two hours, seventeen minutes and five seconds in length, and comprises a plurality of video frames covering a number of scenes, some of which are shown in FIG. 1B. For example, FIG. 1B depicts a video frame 162-1 shown at five minutes, one second of the video file 160; a video frame 162-2 shown at thirty-four minutes, five seconds of the video file 160; a video frame 162-3 shown at one hour, thirteen minutes and sixteen seconds of the video file 160; a video frame 162-4, shown at one hour, twenty-six minutes, fifty-six seconds of the video file 160; and a video frame 162-5 shown at two hours, eleven minutes, forty-seven seconds of the video file 160. The video file 160 is also accompanied by a record of metadata regarding scenes or visual contents of such scenes (e.g., "winter," "bar," "hospital," "aquatic," "hockey"), tagged to specific times or frames at which such scenes occur. The record of metadata may also include identifiers of one or more items, or categories of items, depicted or referenced therein (not shown), and may be stored within the video file 160 or separately, e.g., in one or more other files.

Figure 1C:
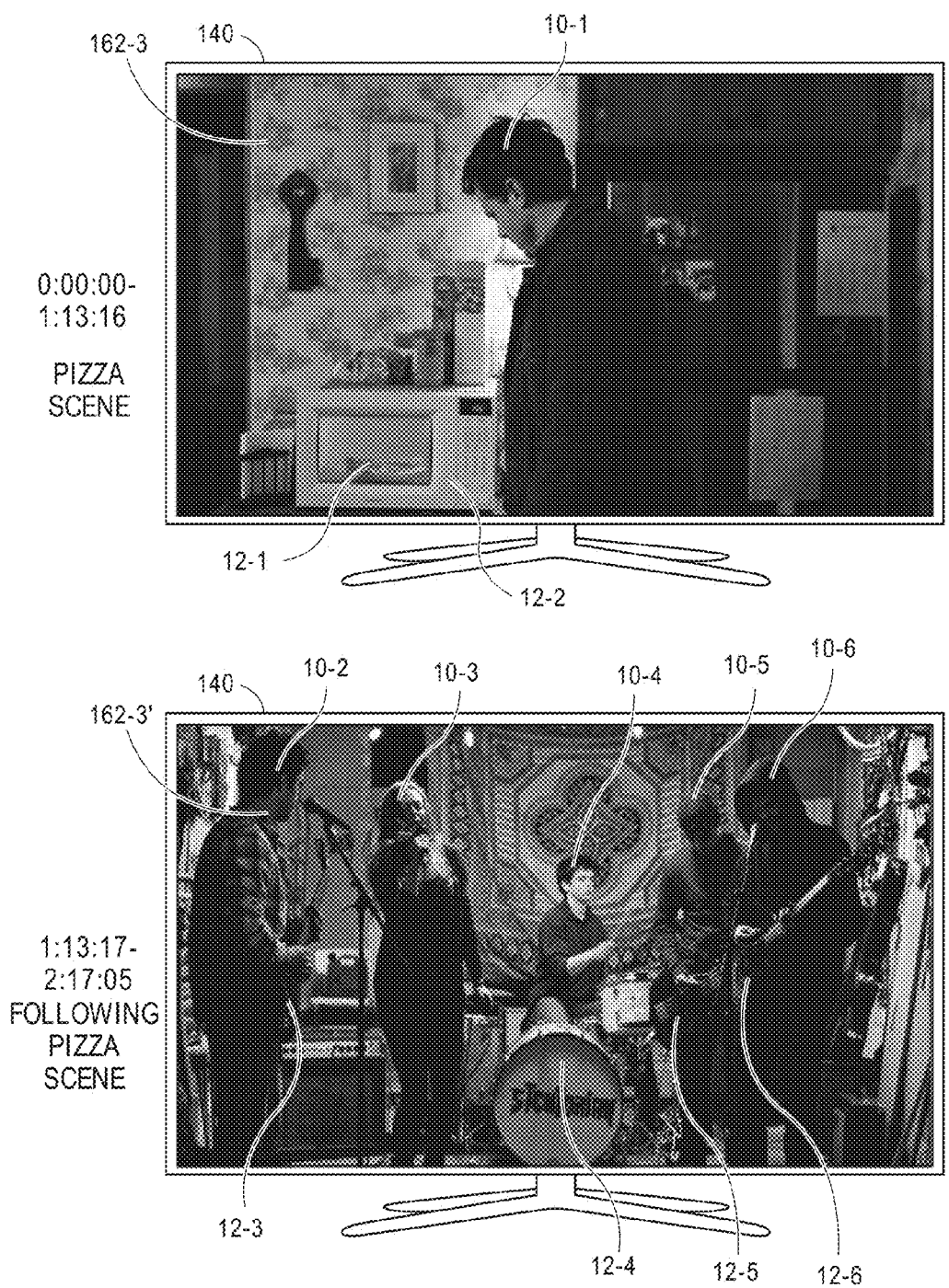

As is shown in FIG. 1C, the video frame 162-3 appears at a conclusion of a scene in which a character 10-1 cooks a slice of pizza 12-1 in a microwave oven 12-2. Immediately thereafter, a video frame 162-3' appears at a beginning of a scene in which characters 10-2, 10-3, 10-4, 10-5, 10-6 play musical instruments 12-3, 12-4, 12-5, 12-6 as members of a band.

Figure 1D:
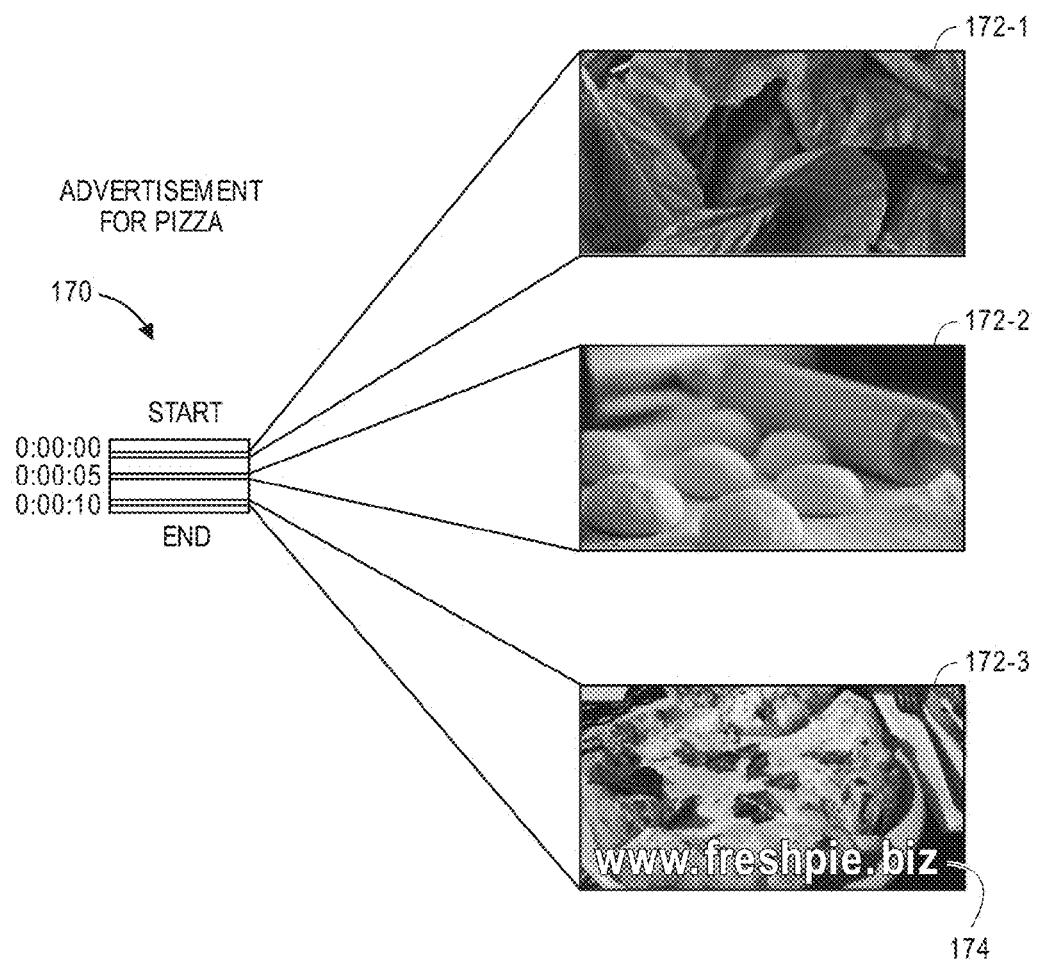

In accordance with the present disclosure, one or more video advertisements may be generated based on visual content of the video file 160 and/or inserted into the video file 160 at a time associated with the visual content of the video file 160. For example, as is shown in FIG. 1D, a video file 170 comprising an advertisement for pizza may be generated based on the content of the video file 160, e.g., the pizza 12-1 shown in the video frame 162-3. The video file 170 is ten seconds in length, and comprises a plurality of video frames relating to the pizza 12-1, including video frames 172-1, 172-2 depicting ingredients of pizza (viz., fresh basil and dough), and a video frame 172-3 showing a pizza prepared from the ingredients shown in the video frames 172-1, 172-2, along with a reference 174 (or identifier) that may be accessed in order to purchase one or more of the pizzas shown therein, or like pizzas.

Figure 1E:
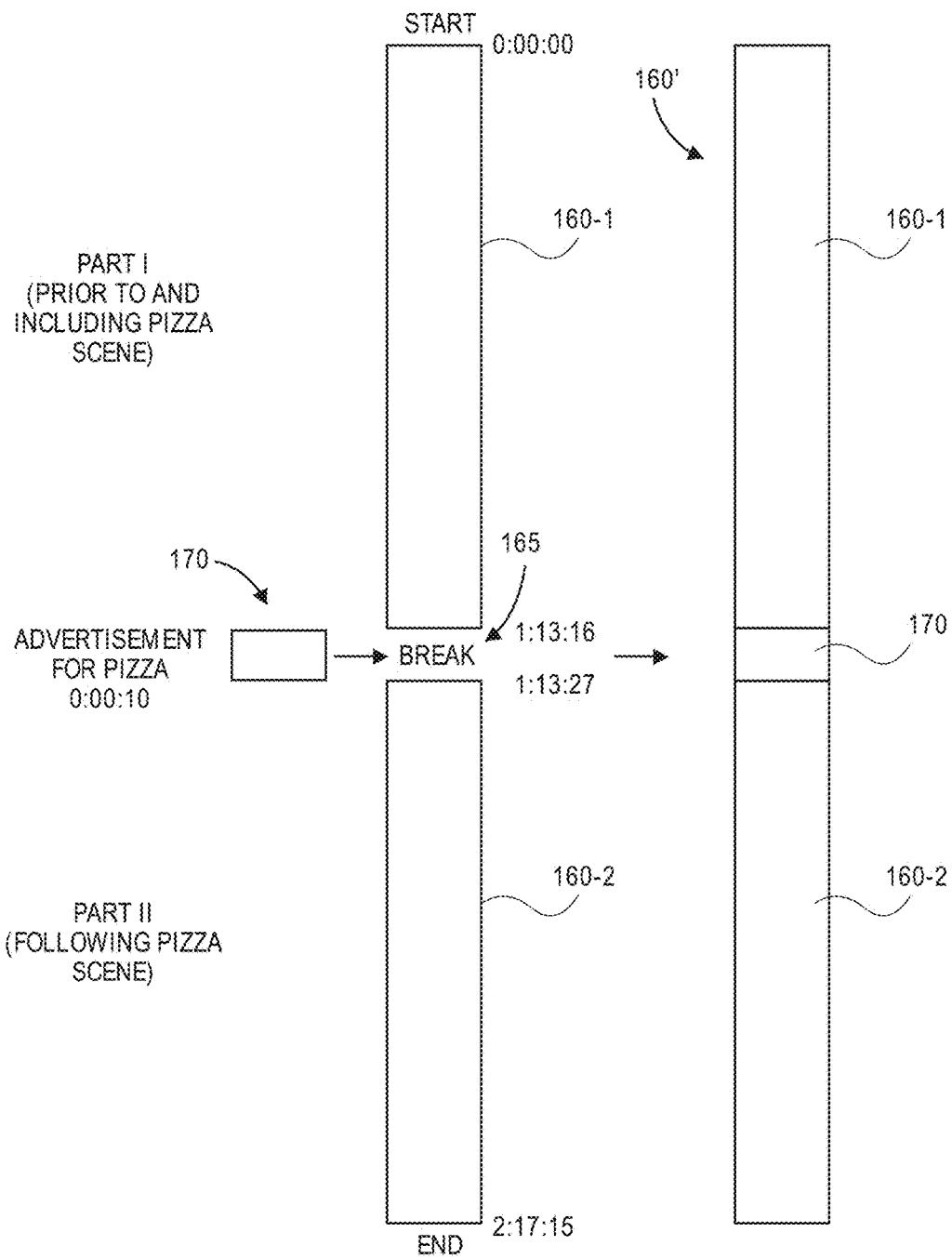

As is shown in FIG. 1E, the video file 170 comprising the advertisement for pizza may be inserted or appended into the video file 160, e.g., by inserting a break 165 into the video file 160, resulting in the generation of a first video part or sub-file 160-1 preceding the break 165 and a second video part or sub-file 160-2 following the break 165, respectively. The break 165 has a duration often seconds, or the same duration as the video file 170, and the video file 170 may be inserted into the break 165 accordingly. As a result, a video file 160' is formed, including the first video part 160-1, the video file 170 and the second video part 160-2 in series. The video file 160' may then be stored in one or more data stores and broadcasted, aired, streamed or otherwise distributed to one or more viewers in any manner, such as over one or more of the communications networks 190-1, 190-2, 190-3.

Alternatively, the video file 160' may be generated dynamically, e.g., spontaneously, or on the fly, as the video file 160 is being broadcasted, aired, streamed or otherwise distributed to one or more viewers. For example, the break 165 may be inserted into the video file 160, and the video file 170 may be aired following the first video part 160-1, with the second video part 160-2 following immediately thereafter.

Figure 1F:
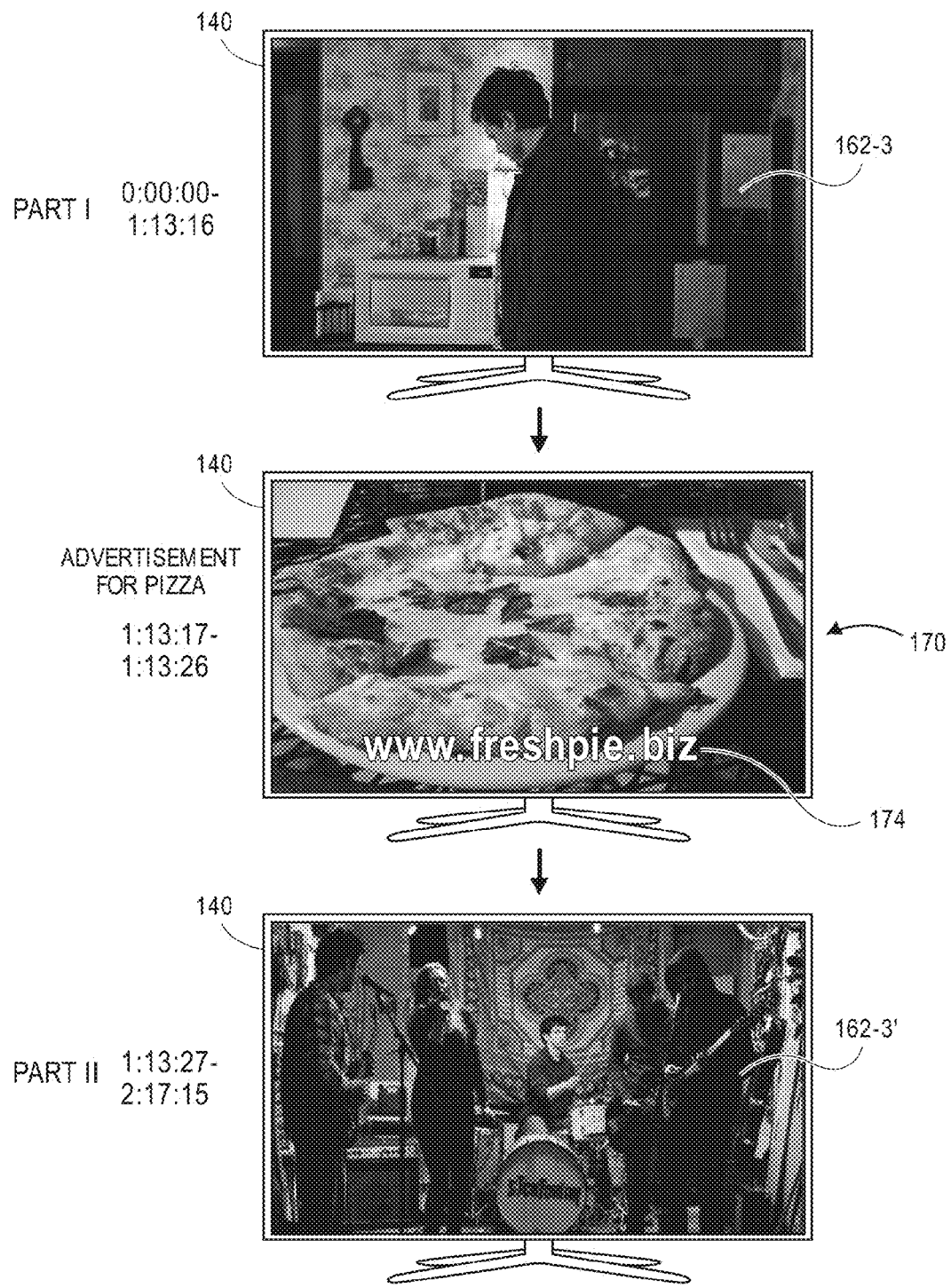

As is shown in FIG. 1F, a viewer of the video file 160' on the television 140 will view the first video part 160-1 immediately prior to the video frame 162-3, e.g., at one hour, thirteen minute and sixteen seconds into the video file 160', before viewing the video file 170 including the ten-second advertisement for pizza. After the various video frames of the video file 170 have been shown, the second video part 160-2 then begins at the video frame 162-3', viz., the video frame that immediately followed the video frame 162-3 in the video file 160. The advertisement for pizza within video file 170, which is relevant to the visual content of the video frame 162-3, thus appears to viewers of the video file 160' naturally and seamlessly following the video frame 162-3.

Today, television commercials are typically aired during programming breaks of three to four minutes in duration, each of which generally occurs at intervals of five to eight minutes in length, between scenes, at times of other changes or inflection points in plots. Commercials typically have a nominal length of thirty to sixty seconds, and may be selected for inclusion in a television program in a number of ways. Occasionally, where a television station or network is in possession of a number of commercials, the commercials may be selected at random and aired during breaks in programming. Alternatively, a merchant offering one or more goods or services to customers may pay the television station or network to air a commercial for such goods or services during breaks occurring within one or more windows of time or previously scheduled programs (e.g., nightly news or televised sporting events). For example, the merchant may select a television program that is believed to be popular among members of a demographic who are also interested in or have a need for the goods or services, and may pay a producer of the television program or a station or network airing the television program a negotiable sum to air the commercial during breaks in the television program.

The same procedures may also be followed where a movie or other extended-length program is aired on television stations or networks, with commercial breaks being inserted between scenes or at other times during programs. Where a movie is shown in cinemas or online, e.g., in a streaming format, the movie may be preceded by one or more video advertisements. Similarly, brief news programs or podcasts may also be preceded by or interrupted for one or more video advertisements.

Contemporary methods for pairing commercials with programs are commonly subject to a number of inherent limitations. For example, where commercial breaks occur at regular times and for fixed durations during a video program, many viewers will elect to change the channel, eat or drink, visit a rest room, or take any other leisure activities, with full knowledge that the breaks are of a predictable duration, and return in time for the break to conclude. Because commercials and commercial breaks have predictable durations, the advent of the DVR and other video recording or streaming technology has enabled many viewers to record programs of interest for the express purpose of fast-forwarding through commercials, in an effort to complete the viewing of programs in a shorter elapsed time.

Furthermore, visual content of commercials typically has little to nothing in common with visual content of video programs during which the commercials are aired, or actual attributes of viewers who are actually viewing such video programs. While some commercials are selected with an eye toward a predicated audience that is expected to view them, there is no apparent relation between the visual content of a commercial and an item being advertised or the visual content of a commercial for the item. Moreover, a viewer is utterly unable to select an item as the subject of a commercial, or a time at which a commercial for the item is to be aired.

One or more of the embodiments disclosed herein may overcome limitations of existing systems and methods for providing advertisements to viewers of video programming that is broadcasted, aired, streamed or otherwise distributed in any format. For example, the systems and methods of the present disclosure may attempt to match visual content of video programming, at a specific time, to visual content or a targeted message of a video advertisement, or to attributes of a viewer of the video programming, and to insert or append the video advertisement into the video programming at a specific time. Video advertisements may be inserted or appended into video programs at opportune times, such that transitions between the advertisements and the programs are not only smooth and seamless but also indistinguishable, inoffensive or unsurprising to a viewer, thereby enhancing the viewer's experience in viewing the video programming. In accordance with the present disclosure, video advertisements need not have fixed durations or be displayed at regular intervals, and are naturally less intrusive or interruptive than video advertisements that are selected and displayed according to traditional methods. For example, where a protagonist of a television series dines on a plate of ribs at his favorite barbecue joint in one episode, an advertisement may for barbecue sauce or beer may be inserted or appended into the episode as the protagonist dines, or immediately thereafter. The advertisement may describe any type of barbecue sauce or beer, including the barbecue sauce or the beer enjoyed by the protagonist in the episode, or other sauces or beers. The advertisement may also include one or more leading or trailing frames that are consistent with the setting at the barbecue joint, or be actually filmed at the barbecue joint, such that transitions between scenes in which the protagonist dines, and the advertisement, are barely noticed by viewers.

In some embodiments, the systems and methods of the present disclosure enable video content providers to select their own commercial breaks within video content at their discretion, regardless of whether the video content is broadcast, aired, streamed or otherwise distributed in a live, delayed or prerecorded format. For example, when an athletic team accomplishes a specific objective during a game or contest (e.g., obtains desirable field position, draws a charge, turns a double play or defeats a power play) that triggers an advertising experience within a stadium or venue, the in-person advertising experience (e.g., a scoreboard display or audio announcement) may be aired to viewers of the game on television before transitioning to a similar advertising experience that is tailored for television. The same goods or services that are offered to fans within the stadium or venue during the in-person advertising experience may be offered to viewers in a televised advertisement before returning to footage of the game or contest. The televised advertisement is thus matched with both the content of the video programming, and the timing of a live event. Similarly, where actresses walk down a red carpet wearing ball gowns designed by a specific merchant prior to a televised awards ceremony, an advertisement for ball gowns offered by that merchant, or an advertisement that features red carpets as background features, may be inserted or appended into the video telecast and displayed to viewers thereafter. The systems and methods of the present disclosure may therefore disrupt traditional models for showing advertisements at specified times and for standard durations during video programming, and may instead show such advertisements at more appropriate times, and in a manner that makes transitions from programming to advertising and back again less jarring or intrusive. Such systems and methods may further increase the receptivity and retention of messages associated with advertising by presenting the advertising in an intelligent manner that is cognizant of, and related to, the visual content of the programming into which the advertising is inserted or appended, or the interests or requests of the actual viewers of the programming.

One or more embodiments of the present disclosure may enable viewers to request, or "pull," relevant video advertising during a video program, thereby permitting a viewer to take control of the advertisements that he or she sees, and also enhancing the value of product placements within video programming. For example, where a video program references a specific product (e.g., a good or a service) at a specific time during the video program, a viewer may request an advertisement regarding the specific product, and the advertisement may be aired as the video program is paused, or in lieu of or alongside a portion of the video program, e.g., overlaying the portion of the video program, or in an inset during the playing of the portion of the video program. Such a request may be made in any manner, such as by one or more signals or instructions to a television or other personal device, e.g., a smartphone, a tablet computer, a remote control, a smart speaker, a smart wristwatch, or the like. In such embodiments, interruptions for advertisements, and content of such advertisements, may therefore be selected at the viewer's discretion. Enhancing a video file with links, ties or references to advertisements for products depicted within the video file inherently increases the value for product placements within the video file, as well as the values of systems configured or viewing a video file that is so enhanced, or copies of the enhanced video file that are stored in any format.

Accordingly, the systems and methods of the present disclosure provide additional and enhanced revenue opportunities for producers of video content, who may circulate records of metadata or other information regarding actual or planned product placements to merchants or advertisers. For example, where a producer of a movie or a television show intends to depict a character consuming a beverage during a scene, the producer may circulate information, data or metadata regarding the scene to beverage companies and/or advertisers, and may solicit bids from such companies or advertisers not only to have their beverage consumed, but also to prepare an advertisement for insertion prior to or following the scene in which the beverage is consumed.

Processes for presenting content-specific video advertisements to viewers may generally include one or more of the following steps. As one step, content of a video file may be analyzed to recognize and/or extract information or data regarding any products (e.g., goods and/or services) depicted or referenced in the video file, as well as locations or settings of events depicted or referenced therein, or any other information or data regarding the content of the video file. For example, one or more video frames of a video file may be analyzed according to one or more detection or recognition algorithms or techniques, such as Canny edge detectors or algorithms; Sobel operators, algorithms or filters; Kayyali operators; Roberts edge detection algorithms; Prewitt operators; Frei-Chen methods; or any other algorithms or techniques to detect or recognize aspects of any objects depicted therein, including but not limited to one or more faces and/or other human body parts. The types of video files that may be analyzed in this manner are not limited, and may include live, delayed or previously recorded video files. Additionally, any audio signals (e.g., a soundtrack) included in or associated with the video files may also be evaluated, along with any metadata that may accompany the video files and any audio signals. For example, a soundtrack of a video file may be evaluated according to one or more analyses in order to recognize aspects of the content, language, structure, syntax or semantics of the soundtrack, including but not limited to any spoken words included therein. Alternatively, products that are depicted or referenced in a video file or in accompanying audio signals may be identified as the video file and/or the audio signals are first recorded. For example, when a scene is filmed, when words of a script are spoken, or when a song or other sounds are recorded for a soundtrack, a data file that includes such video or audio content may then be tagged with identifiers of products that are visible on the scene, referenced in the script or associated with the song, along with times or points at which products are visible or referenced, or times or points at which the song is played.

As a result of such analyses, the video file may be automatically or manually tagged with metadata identifying references to specific products, or categories of products, and times or points at which such references are observed in the video file, along with characteristics of advertisements that may be effectively incorporated into the video file at such times or points (e.g., where advertisements for one or more products, or types of advertisements, may be expected to succeed or fail).

Additionally, any tags or other metadata that are identified in association with a video file may be stored in one or more data stores, in a structured format that may be readily accessed and consumed by producers of video content, e.g., video programs or video advertisements. By storing the metadata in a structured form, sources of the video files may enable content producers, advertising agencies or others to identify and rank relevant video advertisements with respect to times or points at which one or more products are referenced in a video file, or to design one or more video advertisements for inclusion within the video file.

Metadata that may be accessed by producers of video content, advertisers or others may include one or more video frames or clips of a video file, or thumbnails of such frames or clips, and any associated audio signals, and may be used by video content producers or advertisers to identify existing advertisements, or to prepare one or more new advertisements, that are consistent with the video content. In some embodiments, video advertisements may be generated in a manner that enables the advertisements to be seamlessly integrated into the video content with which the video advertisements are associated, such that a viewer may segue from video programming to video advertising, and back to video programming, with minimal negative impact on his or her experience. For example, a first shot of a video advertisement may be recorded at the same location as a scene of a video file into which the video advertisement is to be inserted or appended, thereby enabling video advertising inventory to be crafted according to video content within which the video advertising is to be shown. Alternatively, in some embodiments, an existing video advertisement may be altered to match or closely correspond to a scene of a video file into which the video advertisement is to be inserted or appended. The video advertisements, whether newly generated or previously existing and modified, may thus appear to be native to the viewer.

Additionally, in some embodiments, information or data that may be known regarding one or more viewers of a video file may be utilized in selecting one or more advertisements to be inserted into the video file. For example, referring again to FIG. 1C, the video frame 162-3 depicts the character 10-1 cooking the slice of pizza 12-1 in the microwave oven 12-2. Where a viewer of the video file 160 is known to prefer pizza, the video file 170 may be inserted therein, e.g., following the video frame 162-3, and broadcasted, aired, streamed or otherwise distributed to the viewer. Alternatively, where the viewer is watching the video file 160 at times ordinarily associated with the ordering of pizza, e.g., lunch times, dinner times, or late-night dining times, the video file 170 may be inserted therein. Conversely, where a viewer of the video file 160 is known or believed to be in the market for one or more appliances, including but not limited to microwave ovens, a video file including an advertisement for a microwave oven or another appliance may be inserted into the video file 160. Any extrinsic information or data that may be known regarding a viewer may be used to augment any intrinsic information or data regarding a video file in identifying one or more advertisements to be presented to the viewer. Moreover, an advertisement may be selected for a viewer regardless of the format in which a video file is presented to the viewer. For example, separate copies of the video file 160 may be modified to include advertisements for pizza (viz., the video file 160' of FIG. 1E) and also to include advertisements for microwave ovens after the video frame 162-3. Where the separate copies are each burned or otherwise recorded onto a DVD or another medium, a copy including the advertisement for pizza following the video frame 162-3 (e.g., the video file 160' of FIG. 1E) may be shipped to a customer who is known or believed to prefer pizza, e.g., where the customer purchases the movie from an online marketplace or is to receive the movie as a gift. Likewise, a copy including the advertisement for a microwave oven following the video frame 162-3 may be shipped to a customer who is known or believed to be in the market for one or more appliances, such as microwave ovens. Alternatively, where a viewer purchases the movie in a streaming format, e.g., from a video-on-demand service or an online marketplace, a version of the movie that includes the advertisement for pizza following the video frame 162-3 (e.g., the video file 160' of FIG. 1E) may be streamed to a viewer who is known or believed to prefer pizza, while a version of the movie that includes an advertisement for a microwave oven following the video frame 162-3 may be streamed to a viewer who is known or believed to be in the market for one or more appliances, such as microwave ovens. Extrinsic information or data regarding a viewer may be determined from any source, including but not limited to a prior search history or purchasing history (e.g., from a video-on-demand service or an online marketplace), from one or more social network postings, or in any other manner.

The systems and methods of the present disclosure thus have extensive ramifications for the manner in which video advertisements are selected for presentation to viewers of video files, or are so presented, and the revenues generated thereby. For example, where a record of categories of products that are depicted or referenced in a video file is generated and made available to advertisers, manufacturers or marketers of products in the categories depicted or referenced therein may produce video advertisements that are consistent with the portions of the video file in which such products are depicted or referenced, or modify video advertisements to coincide or correspond with such portions, and submit such advertisements to producers of the video file. Meanwhile, the producers may select advertisements for presentation within the video file according to a competitive bidding process, or following the payment of one or more premiums, thereby increasing their revenues from the production of the video file accordingly. More particularly, where a specific product is depicted or referenced in a video file, and a record of the depiction or reference thereof is made available to advertisers, a video advertisement may be prepared by a manufacturer or marketer of the specific product, or of a competitor to the specific product, and provided to the producers of the video file, along with a bid or a premium for the display of the video advertisement within the video file.

In some embodiments, a producer of a video file may rank or score advertisements with respect to their similarity or appropriateness for inclusion generally within the video file, or at discrete times or points within the video file, e.g., following one or more sets of video frames, based on the visual content of the video file or such video frames. In some embodiments, advertisements may be automatically ranked, e.g., by one or more machine learning algorithms or techniques, or in any other manner, based on the similarity or appropriateness for inclusion within the video file. For example, two or more manufacturers or owners of brands associated with a product (e.g., a good or a service) may bid or compete to present a specific video advertisement at a specific time or point within a video file, and a score indicative of the similarity of each of the video advertisements (e.g., a similarity score) to the video frames within which the video advertisements are to be inserted or appended may be calculated manually or automatically for each of the video advertisements. The similarity score may consider the similarity of the visual content of the video frames to the visual content of the video advertisements, e.g., the similarity of edges, contours, outlines, colors, textures, silhouettes, shapes or other characteristics of objects, or portions of objects, expressed in the respective video frames of a video file and the video advertisements. Bids or premiums for inserting or appending such advertisements into the video file may be assessed based on the similarity of the video advertisement to the video file, such that airing a more similar video advertisement may cost less than airing a less similar video advertisement, or any other factor. For example, in some embodiments, similarity scores may be calculated for each of a plurality of video advertisements, and the similarity scores may be multiplied by bids or premiums offered by producers of the video advertisements, in order to arrive at specific prices for airing each of the video advertisements. Using similarity scores to arrive at prices for airing video advertisements provides a financial incentive to producers of the video advertisements to most closely match the visual content of their video advertisements to the visual content of the video files into which such video advertisements are to be inserted or appended, and to design their video advertisements in a manner that grabs the attention of viewers, and encourages the viewers to "pull" or request video advertisements related to visual content that they are currently viewing.

Imaging data such as visual imaging data (e.g., color, grayscale or black-and-white imaging data) or depth imaging data may be captured using one or more imaging devices such as digital cameras, depth sensors or range cameras. Such devices may generally operate by capturing light that is reflected from objects, and by subsequently calculating or assigning one or more quantitative values to aspects of the reflected light, e.g., pixels, generating an output based on such values, and storing such values in one or more data stores. Digital cameras may include one or more sensors having one or more filters associated therewith, and such sensors may detect information regarding aspects of any number of pixels of the reflected light corresponding to one or more base colors (e.g., red, green or blue) of the reflected light, or distances to objects from which the light was reflected. Such sensors may generate data files including such information, and store such data files in one or more onboard or accessible data stores (e.g., a hard drive or other like component), as well as one or more removable data stores (e.g., flash memory devices), or displayed on one or more broadcast or closed-circuit television networks, or over a computer network as the Internet.

Imaging data files that are stored in one or more data stores may be printed onto paper or other alternatives, presented on one or more computer displays, or subjected to one or more analyses, such as to identify items expressed therein. Imaging data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective positions, fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., zooming the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting a position, axis or direction of the device, i.e., by moving, panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some modern imaging devices may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color candy apple red is expressed as #D61123. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection or recognition algorithms or techniques that may be utilized in order to detect or recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or others.

Figure 2:
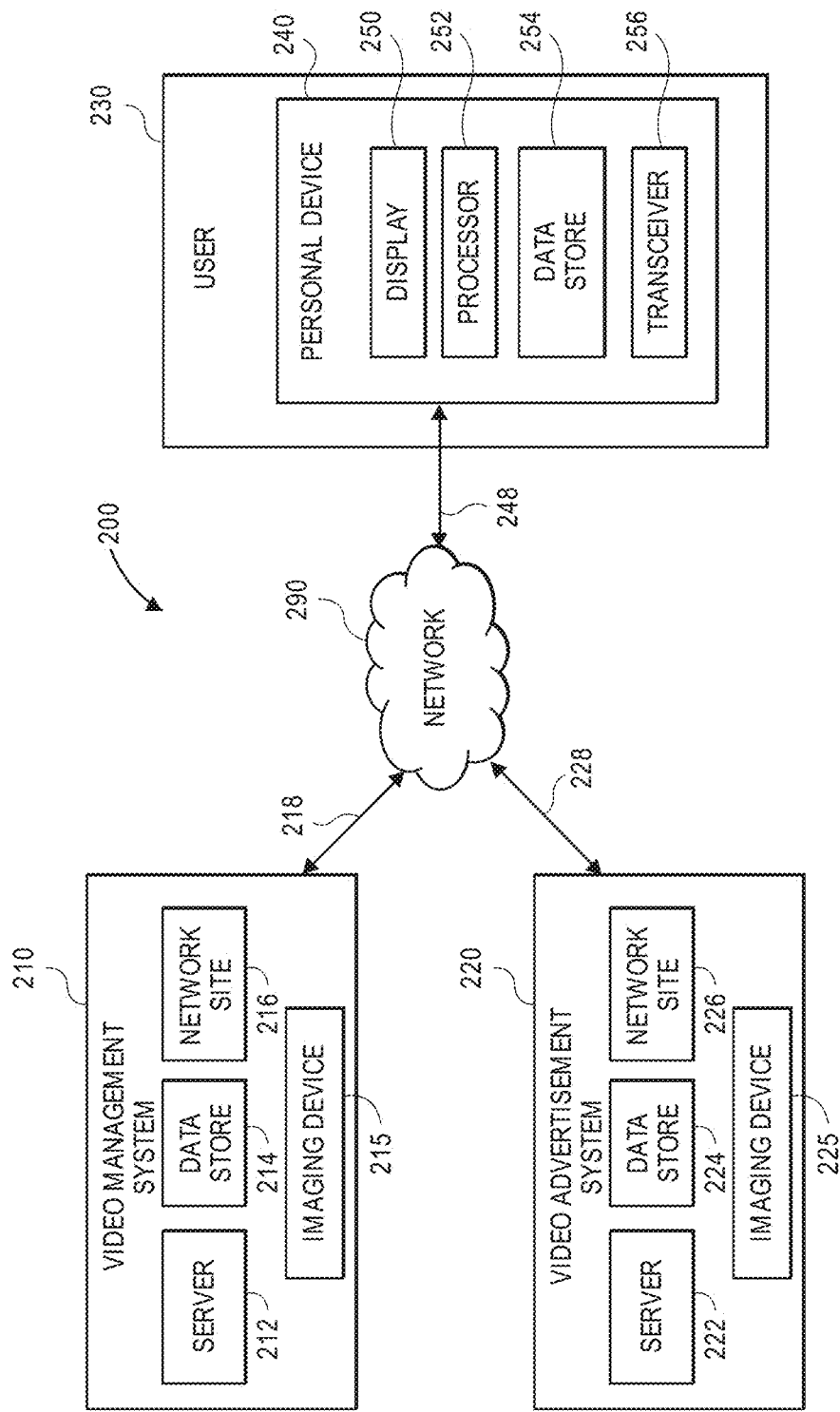
FIG. 2 is a block diagram of components of one system for providing content-specific video advertising in accordance with embodiments of the present disclosure.

Referring to FIG. 2, a block diagram of components of one system 200 for providing content-specific video advertising in accordance with embodiments of the present disclosure is shown. The system 200 shown in FIG. 2 includes a video management system 210, a video advertisement system 220 and a user 230 that are connected to one another over one or more networks 290.

The video management system 210 may be any source or origin of digital media, e.g., still or moving images or other video content, audio content or other multimedia by way of a networked computer infrastructure, including one or more physical computer servers 212 and data stores 214 (e.g., databases) for hosting a network site 216 (or network sites). For example, the video management system 210 may be any individual or entity associated with the broadcasting, airing, streaming or distribution of one or more video files over the networks 290. The video management system 210 may also be provided in connection with one or more physical or virtual services configured to manage or monitor such files, as well as one or more other functions. The servers 212 may be connected to or otherwise communicate with the data stores 214 and may include one or more processors. The data stores 214 may store any type of information or data, including digital media files or any like files containing multimedia (e.g., audio and/or video content), for any purpose. The servers 212 and/or the data stores 214 may also connect to or otherwise communicate with the networks 290, as indicated by line 218, through the sending and receiving of digital data. The video management system 210 of FIG. 2 further includes one or more imaging devices 215 (e.g., visual imaging devices such as digital cameras), which may include any other type of imaging sensor or system for capturing imaging data.

In some embodiments, the video management system 210 may be an Internet-based streaming content and/or media service provider. For example, the video management system 210 may be configured to distribute media over the network 290 to one or more general purpose computers or computers that are dedicated to a specific purpose. The video management system 210 may also be configured to transmit content via a direct broadcast system, or to one or more specifically configured components such as set-top boxes or like units or components (e.g., cable boxes or converters).

For example, in some embodiments, the video management system 210 may be associated with a television channel, network or provider of any type or form that is configured to transmit video files over the airwaves, via wired cable television systems, by satellite, over the Internet, or in any other manner. In some embodiments, the video management system 210 may also be associated with any streaming video source that streams one or more video files for free or for a one-time or recurring fees. In some embodiments, the video management system 210 may be associated with any type or form of network site (e.g., a web site), including but not limited to news sites, sports sites, cultural sites, social networks or other sites, that streams one or more video files over a network. In essence, the video management system 210 may be any individual or entity that makes video files of any type or form available to any other individuals or entities over one or more networks 290.

The video management system 210 of FIG. 2 may be independently provided for the exclusive purpose of managing the monitoring and distribution of video files or other information or data captured by the imaging device 215, such as visual imaging data and/or accompanying audio signals and metadata. Alternatively, the video management system 210 may be operated in connection with one or more physical or virtual services configured to manage the monitoring or distribution of such files, as well as one or more other functions. The servers 212 may be connected to or otherwise communicate with the data stores 214 and may include one or more processors, circuits or other like systems or components. The data stores 214 may store any type of information or data, including digital media files or any like files containing multimedia (e.g., audio and/or video content), for any purpose. The network sites 216 may be provided for any purpose in association with the video management system 210, including but not limited to the marketing of one or more video files, receiving and granting authentication requests (e.g., log-in names and/or passwords), or any other purpose. The servers 212 and/or the computer processors may also connect to or otherwise communicate with the networks 290, as indicated by line 218, through the sending and receiving of digital data.

The imaging device 215 may comprise any form of optical recording sensor or device that may be used to photograph or otherwise record information or data regarding activities occurring within one or more areas or regions of a given environment, e.g., a scene or a setting, or for any other purpose. The video management system 210 may include one or more of the imaging devices 215, each of which may include any number of sensors, memory or storage components (e.g., a database or another data store), processors and any other components that may be required in order to capture, analyze and/or store imaging data or accompanying audio signals captured from within static or variable environments in which the imaging device 215 is provided. For example, one or more of the imaging devices 215 may capture one or more still or moving images, along with any relevant audio signals or other information, and may also connect to or otherwise communicate with one another, or with the network 290.

In addition to the imaging device 215, the video management system 210 may include any type or form of systems or components for receiving video files and associated audio signals or metadata, e.g., over the networks 290. For example, the video management system 210 may receive one or more video files via any wired or wireless means and store such video files in the one or more data stores 214 for subsequent processing, analysis and distribution. In some embodiments, the video management system 210 may process and/or analyze video files captured by the imaging device 215 or received over the networks 290 from one or more external sources according to one or more detection or recognition algorithms or techniques, in order to detect or recognize one or more attributes of the visual content expressed therein, or of the audio signals accompanying such visual content. In some embodiments, the video management system 210 may be further configured to add or assign metadata, e.g., one or more tags or virtual markings, to video files. Such metadata may indicate times or points within a video file where one or more specific products or categories of products is depicted or referenced therein, or include one or more identifiers of such products or categories. The video management system 210 may generate any type or form of record associated with the visual content of a video file, or the audio signals accompanying the video file, and may store such records in association with a corresponding video file or separately, e.g., in a structured form. Such records may be made available to other entities, such as the video advertisement system 220, e.g., over the networks 290.

Additionally, the video management system 210 may be further configured to edit, crop, alter, modify or adjust one or more attributes of a video file. For example, where a video file including a video advertisement is received from the video advertisement system 220, e.g., over the networks 290, the video file may be inserted or appended into another video file, such as a movie, following or prior to one or more predetermined video frames. The video management system 210 may also be configured to compare and contrast visual content and/or audio signals or metadata regarding two or more video files, and to make any number of determinations regarding the similarity or differences between such video files, audio signals or metadata. For example, the video management system 210 may be configured to identify attributes of one or more video frames of a video file, such as information or data regarding edges, contours, outlines, colors, textures, silhouettes, shapes or other characteristics of objects or portions thereof expressed in such video frames, e.g., according to one or more detection or recognition algorithms or techniques, and to compare such attributes to attributes of other video frames of other video files. The video management system 210 may also be configured to calculate one or more scores indicative of similarities or differences between such frames or such files. The video management system 210 may also be configured to engage in communications of any type or form with the video advertisement system 220 and/or the user 230.

The video management system 210 may further broadcast, air, stream or otherwise distribute video files maintained in the data stores 214 to one or more users, such as the user 230, over the networks 290. Accordingly, in addition to the server 212, the data stores 214, the imaging device 215 and the network sites 216, the video management system 210 may also include any number of components associated with the broadcasting, airing, streaming or distribution of such files, including but not limited to transmitters, receivers, antennas, cabling, satellites, or communications systems of any type or form. Processes for broadcasting, airing, streaming and distribution of video files over various networks are well known to those skilled in the art of communications and thus, need not be described in more detail herein.

The video advertisement system 220 may be any individual or entity associated with the generation, management and/or distribution of video files including advertisements for goods or services of any type or form. As is shown in FIG. 2, the video advertisement system 220 includes one or more physical computer servers 222 having a plurality of data stores 224 associated therewith, and may be associated with any network sites (e.g., web sites) 226 that generate one or more pages for viewing and use by any users, and for any specific or general purpose. The video advertisement system 220 of FIG. 2 further includes one or more imaging devices 225. The servers 222, the data stores 224, the imaging devices 225 and the network sites 226 may be similar to the servers 212, the data stores 214, the imaging devices 215 and the network sites 216 of the video management system 210, and may be used to perform one or more functions that are similar to the servers 212, the data stores 214, the imaging devices 215 and the network sites 216 of the video management system 210.

For example, in some embodiments, the video advertisement system 220 may receive or access one or more records of information, data or metadata regarding the visual content of one or more video files maintained by the video management system 210 or elsewhere. Based on such information, data or metadata, the video advertisement system 220 may generate video files including video advertisements, e.g., using the imaging device 225, or modify one or more existing video files including video advertisements, and transfer such video files to the video management system 210 over the networks 290 or by any other means. For example, in response to determining that a specific scene in a video file maintained by the video management system 210 or elsewhere depicts or references one or more products, was filmed in a specific location, or includes specific content, the video advertisement system 220 may generate a video advertisement depicting or referencing a product (e.g., one of the products referenced in the video file, or in a category of one of the products referenced in the video file), a video advertisement that is filmed in the specific location or in a similar location, or a video advertisement that includes the specific content or similar content, and provide a video file including the video advertisement to the video management system 210. Additionally, the video advertisement system 220 may further calculate and/or communicate bids or offers to the video management system 210, engage in communications of any type or form with the video management system 210 and/or the user 230.

The user 230 may be any individual or entity having access to one or more personal devices 240, e.g., general purpose or special purpose devices, for viewing content and/or communicating with other computer devices over the networks 290. For example, the personal device 240 may be a television of any type or form, as well as any type of networked computer device (e.g., a personal digital assistant, a digital media player, a smartphone, a web pad, an electronic book reader, a desktop computer, a laptop computer or a tablet computer, as well as a wearable computer device such as a pair of augmented reality glasses or a wristwatch, or a computer device that may be incorporated into one or more vehicles or appliances) or any other like machine that may operate or access one or more software applications, that may be configured to render content on one or more displays or to interact with such content.

The personal device 240 may include a display 250, a processor 252, a data store 254 and/or a transceiver 256. The display 250 may be a monitor or any other like machine having a screen for viewing rendered video content. For example, the display 250 may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 250 may be configured to receive content from any number of sources via one or more wired or wireless connections, including but not limited to the video management system 210 and/or the video advertisement system 220 over the networks 290.

Those of ordinary skill in the pertinent arts will recognize that the personal device 240 may include any number of hardware components or operate any number of software applications for receiving and rendering content received from the video management system 210 and/or the video advertisement system 220, including one or more processors 252, data stores 254 and/or transceivers 256. For example, the processors 252 may be configured to operate one or more software applications, e.g., a browser, a viewing application operating one or more codecs, or a shopping application, and render content to the user 230 via one or more screens and/or user interfaces. The processor 252 may execute one or more computer-based instructions that may be stored on the data store 254, along with one or more video files or operating programs or instructions. The transceivers 256 may be configured to communicate over one or more of the networks 290, such as by receiving and interpreting broadcast signals, cable television signals, computer signals, cellular telephone signals or any other type or form of signals, and responding in kind with any number of corresponding or reciprocal signals.

Moreover, those of ordinary skill in the pertinent arts will further recognize that, alternatively, in some embodiments, the personal device 240 need not be associated with the user 230. For example, the personal device 240 may be provided in a public place, beyond the control of the user 230, e.g., a television provided in a bar, restaurant, transit station, or shopping center, or an electronic billboard provided in a population center or along a transit line, where the user 230, or any other individuals, may view and/or interact with video content rendered on the display 250.

Although the system 200 shown in FIG. 2 shows boxes for one video management system 210, one video advertisement system 220, and one user 230 having one personal device 240, those of ordinary skill in the pertinent arts will recognize that any number of video management systems 210, video advertisement systems 220 and users 230 may be considered in accordance with the present disclosure. For example, multiple users 230 may access, view and interact with video content provided by multiple video management systems 210 (e.g., television channels or networks, marketplaces, social networks and any other content providers or sites), via multiple personal devices 240, and such video content may include multiple advertisements provided by multiple video advertisement systems 220. Moreover, the personal devices 240 with which the user 230 may access, view and interact with video content may include all or fewer of the components shown in FIG. 2 or perform all or fewer of the functions described herein. For example, the user 230 may view video content on one personal device 240, and may request one or more video advertisements relating to that video content on another personal device 240, such as a remote control, a smartphone, a smart speaker, a smart wristwatch, or the like.

The networks 290 may be any wired network, wireless network, or combination thereof, and may comprise the Internet, intranets, broadcast networks, cellular television networks, cellular telephone networks, satellite networks, or any other networks, in whole or in part. In addition, the network 290 may be a personal area network, local area network, wide area network, cable network, satellite network, cellular telephone network, or combination thereof, in whole or in part. The network 290 may also be a publicly accessible network of linked networks, possibly operated by various distinct parties, such as the Internet. In some embodiments, video files may be provided by the video management system 210 to the personal device 240 of the user 230 over multiple networks. For example, a video file may be broadcast over the air or via satellite to a cable television provider, before being transmitted by the satellite or the provider to a receiver associated with the personal device 240, and shown on the display 250 and/or recorded in the data store 254. Alternatively, the video file may be transmitted over a traditional computer network, such as the Internet, prior to reaching the personal device 240. In some embodiments, the network 290 may include a private or semi-private network, such as a corporate or university intranet. The network 290 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The video management system server 212, the video advertisement agency server 222 and the personal device 240, and associated components, may use any web-enabled or Internet applications or features, or any other client-server applications or features including E-mail or other messaging techniques, to connect to the networks 290, or to communicate with one another, such as through short or multimedia messaging service (SMS or MMS) text messages. For example, the video management system server 212, the video advertisement agency server 222 and the personal device 240 may be configured to transmit information or data in the form of synchronous or asynchronous messages to one another in real time or in near-real time, or in one or more offline processes, via the networks 290. Those of ordinary skill in the pertinent art would recognize that the video management system server 212, the video advertisement agency server 222 and the personal device 240 may operate any of a number of computing devices that are capable of communicating over the networks 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the video management system server 212, the video advertisement agency server 222 or the processor 252, or to any other computers or control systems utilized by the video management system 210, the video advertisement system 220 or the user 230, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

As used herein, the terms "product" or "item," or like terms, may be used to refer to any good or service that may be depicted or referenced in one or more video files, or may be the subject of one or more advertisements. As used herein, the terms "video file," "video stream," "video program," or like terms, may refer to files comprising a plurality of video frames that are configured for broadcasting, airing, streaming or distributing in any manner, such as over any number of networks, or in a hard storage format (e.g., a DVD, a stick drive or another physically portable format). As used herein, the terms "video advertisement," "commercial" or "video commercial," or like terms, may refer to video content that is primarily directed to the marketing of one or more goods or services, or to providing one or more public service announcements. As used herein, the term "visual content," or like terms, refer to visual aspects of one or more video frames of a video file, including but not limited to edges, contours, outlines, colors, textures, silhouettes, shapes or other characteristics of objects, or portions of objects, expressed in the one or more video frames.

Figure 3:
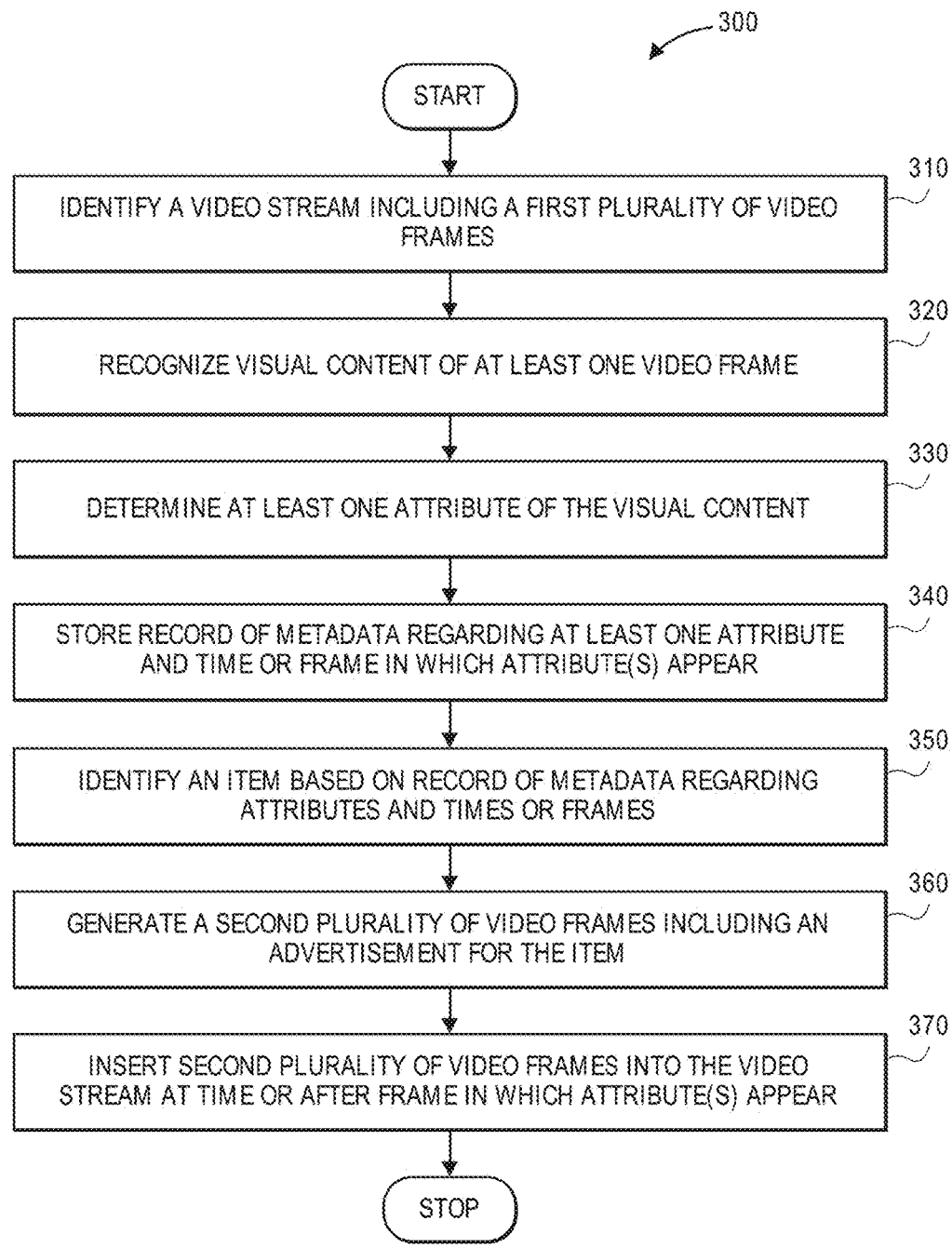
FIG. 3 is a flow chart of one process for providing content-specific video advertising in accordance with embodiments of the present disclosure.

Referring to FIG. 3, a flow chart of one process for providing content-specific video advertising in accordance with embodiments of the present disclosure is shown. At box 310, a video stream including a first plurality of video frames is identified. In some embodiments, the video stream may be aired live, or subject to a broadcast delay. In some embodiments, the video stream may be stored in one or more data stores, such as a movie or a recording of a previously played sporting event, or maintained in any other format. At box 320, visual content of at least one of the first plurality of video frames is recognized. For example, the video frames may be subject to any type or form of object detection or recognition algorithms or techniques, including but not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts. The visual content may be analyzed and recognized in real time, or in near-real time, or in one or more batch processes or back-end processes.

At box 330, at least one attribute of the visual content is determined. Such attributes may include not only an identifier of a specific product shown in the visual content, or a category of products shown in the visual content, but also locations of aspects of the visual content within one or more video frames, or colors or textures of background or foreground features expressed within the video frames. In some embodiments, a product may be identified specifically, e.g., an Amazon Echo device, based on its visual appearance in the one or more video frames. In some embodiments, a product may be identified generally, e.g., a smart speaker, based on its visual appearance. Additionally, in some embodiments, one or more actors and/or actresses may be identified as being visible within a video frame, e.g., based on facial recognition techniques. In some other embodiments, a location of a scene or a setting may be identified based on landmarks or other features that are visible within a video frame, e.g., Seattle's Space Needle, or Hartford's Travelers Tower. In some other embodiments, one or more audio signals accompanying the video content may also be analyzed, e.g., in order to recognize one or more aspects of the content, language, structure, syntax or semantics of the audio signals, and one or more attributes of the video content may be determined from such analyses.

At box 340, a record of metadata regarding the at least one attribute of the visual content determined at box 330, and a time or a frame in which the at least one attribute appears, e.g., one or more of the video frames from which the visual content was recognized at box 320, is generated and stored in at least one data store. The record may include identifiers of products or categories of products depicted or referenced in the visual content, as well as any other information or data regarding the visual content, such as analyses of the colors and/or textures of any background or foreground features shown therein, or identities of actors, actresses, or locations of scenes, and times at which (or frames in which) such products, categories, colors, textures, background features, foreground features, actors, actresses or scenes appear. At box 350, an item is identified based on the record of the metadata regarding the attributes and the times or frames. For example, a specific product (e.g., a good or service) depicted or described in the visual content may be identified. Alternatively, a category of products depicted in the visual content may be identified, and a product in the category of products may be selected accordingly.

At box 360, a second plurality of video frames including an advertisement for the item identified at box 350 is generated. The advertisement may take any visual form, including but not limited to still or moving images of the item in use, and may also include one or more alphanumeric characters identifying the item, interactive or static references to hyperlinks, telephone numbers, electronic mail addresses or street addresses where the item or information regarding the item may be obtained, or the like. In some embodiments, any type or form of audio signals may accompany one or more of the second plurality of video frames. Moreover, in some embodiments, one or more leading video frames of the advertisement may be designed to coincide or correspond with background or foreground features of one or more of the first plurality of video frames in which the item is depicted or referenced. Likewise, one or more trailing video frames of the advertisement may also be designed to coincide or correspond with background or foreground features of one or more of the first plurality of video frames following the depiction of or reference to the item. Where leading and trailing video frames of the advertisement are selected to coincide or correspond with video frames of the first plurality of video frames, the advertisement may be inserted or appended into the first plurality of video frames at the locations of such video frames, and a seamless transition between the first plurality of video frames and the advertisement may be achieved.

Alternatively, in some embodiments, a plurality of video frames comprising an existing advertisement for the item identified at box 350 may be identified, rather than generating a new advertisement for the item. In some embodiments, leading and trailing video frames of the existing advertisement may be modified to coincide or correspond with background or foreground features of one or more of the first plurality of video frames following a depiction of or reference to the item, and a seamless transition between the first plurality of video frames and the modified existing advertisement may be achieved.

At box 370, the second plurality of video frames are inserted into the video stream at the time or after the at least one of the first plurality of video frames in which the attributes appeared, and the process ends. For example, the first plurality of video frames may be partitioned into two or more parts, e.g., by inserting a break into the first plurality of video frames after the at least one of the first plurality of video frames, and the second plurality of video frames may be inserted or appended into the break. A modified video file including the partitioned first plurality of video frames, and the second plurality of video frames inserted therebetween, may be generated and stored in at least one data store, and broadcasted, aired, streamed or otherwise distributed to one or more users.

Figure 4:
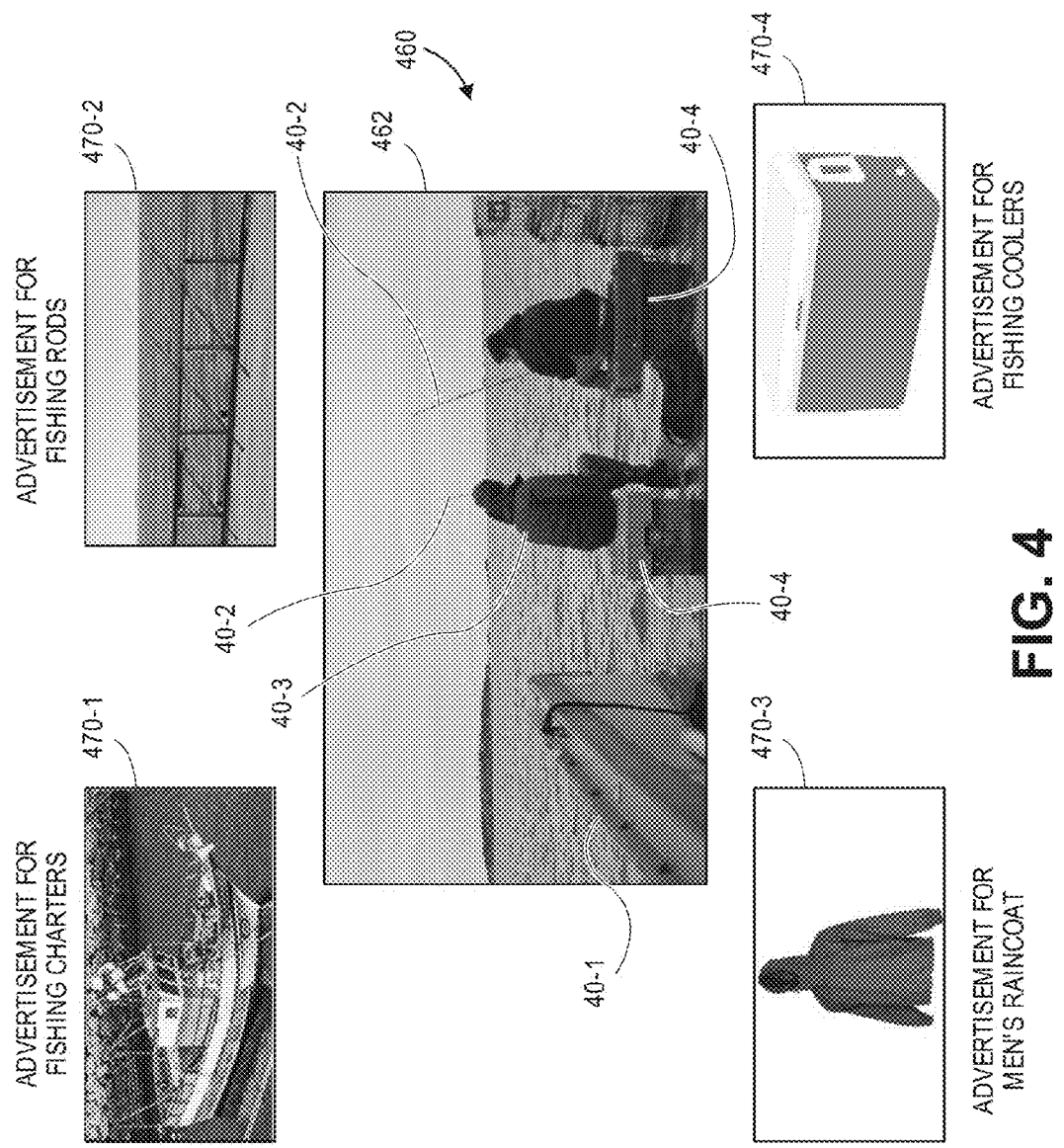
FIG. 4 is a view of aspects of one system for providing content-specific video advertising in accordance with embodiments of the present disclosure.

As is discussed above, video advertisements may be generated or identified based on the visual content of one or more video files. In some embodiments, a video advertisement may be selected for inclusion in a video file based on a comparison of attributes of the visual content of the video advertisement to attributes of the visual content of the video file, e.g., intrinsic information or data regarding the video file. Referring to FIG. 4, a view of aspects of one system for providing content-specific video advertising in accordance with embodiments of the present disclosure is shown.

As is shown in FIG. 4, a video frame 462 of a video file 460 depicts a pair of males on a fishing boat 40-1 during an overcast morning. Each of the males is manipulating a fishing rod 40-2, while one of the males is wearing a raincoat 40-3, and each of the males is seated on a fishing cooler 40-4.

In accordance with the present disclosure, the video frame 462 and other video frames of the video file 460 may be processed and analyzed to recognize attributes of the visual content, including but not limited to one or more products or categories of products expressed in the video frame 462. Based on the visual content, one or more advertisements for the products expressed in the video frame 462, or for products in categories of the products expressed therein, may be identified. As is shown in FIG. 4, a video file 470-1 comprising an advertisement for one or more fishing charters is identified based on the recognized presence of the fishing boat 40-1 in the video frame 462. A video file 470-2 comprising an advertisement for fishing rods is identified based on the recognized presence of the fishing rods 40-2 in the video frame 462. A video file 470-3 comprising an advertisement for a men's raincoat is identified based on the recognized presence of the raincoat 40-3 in the video frame 462. A video file 470-4 comprising an advertisement for a fishing cooler is identified based on the recognized presence of the fishing cooler 40-4 in the video frame 462.

Therefore, in accordance with the present disclosure, one or more of the video files 470-1, 470-2, 470-3, 470-4 may be inserted or appended into the video file 460, either immediately following the video frame 462, or after one or more frames that are displayed shortly after the video frame 462. In some embodiments, where one or more products are recognized as being depicted or referenced within the video file 460, and a plurality of advertisements for the recognized products, or for products in categories of the recognized products, are identified, such as the advertisements included in the video files 470-1, 470-2, 470-3, 470-4, one or more of the advertisements may be selected for inclusion after the video frame 462 based on the similarity of the visual content depicted or referenced in the respective advertisements to the visual content of the video frame 462. For example, referring again to FIG. 4, because the video file 470-2 includes not only items in the category of the items 40-2, or the actual items 40-2 themselves, but also depicts such items in a setting having a body of water and horizon that have colors similar to the colors of the body of water and horizon shown in the video frame 462, the video file 470-2 may be most likely selected for inclusion into the video file 460 after the video frame 462, as opposed to the video files 470-1, 470-3, 470-4.

Alternatively, two or more of the video files 470-1, 470-2, 470-3, 470-4 may be inserted or appended into the video file 460 in series, e.g., after the video frame 462. For example, where multiple advertisements for items depicted or referenced in a video file are selected for insertion into the video file, the advertisement that features visual content that is most similar to visual content of a first video frame of the video file may be selected for insertion into the video file first, following the first video frame, and may be followed by the one or more other advertisements. Likewise, another advertisement that features visual content that is most similar to visual content of a second video frame following the first video frame of the video file may be selected for insertion into the video file last, after each of the one or more other advertisements. In this manner, two or more advertisements may be seamlessly inserted or appended into a video file with little adverse impact on an experience of the viewer.

Figure 5:
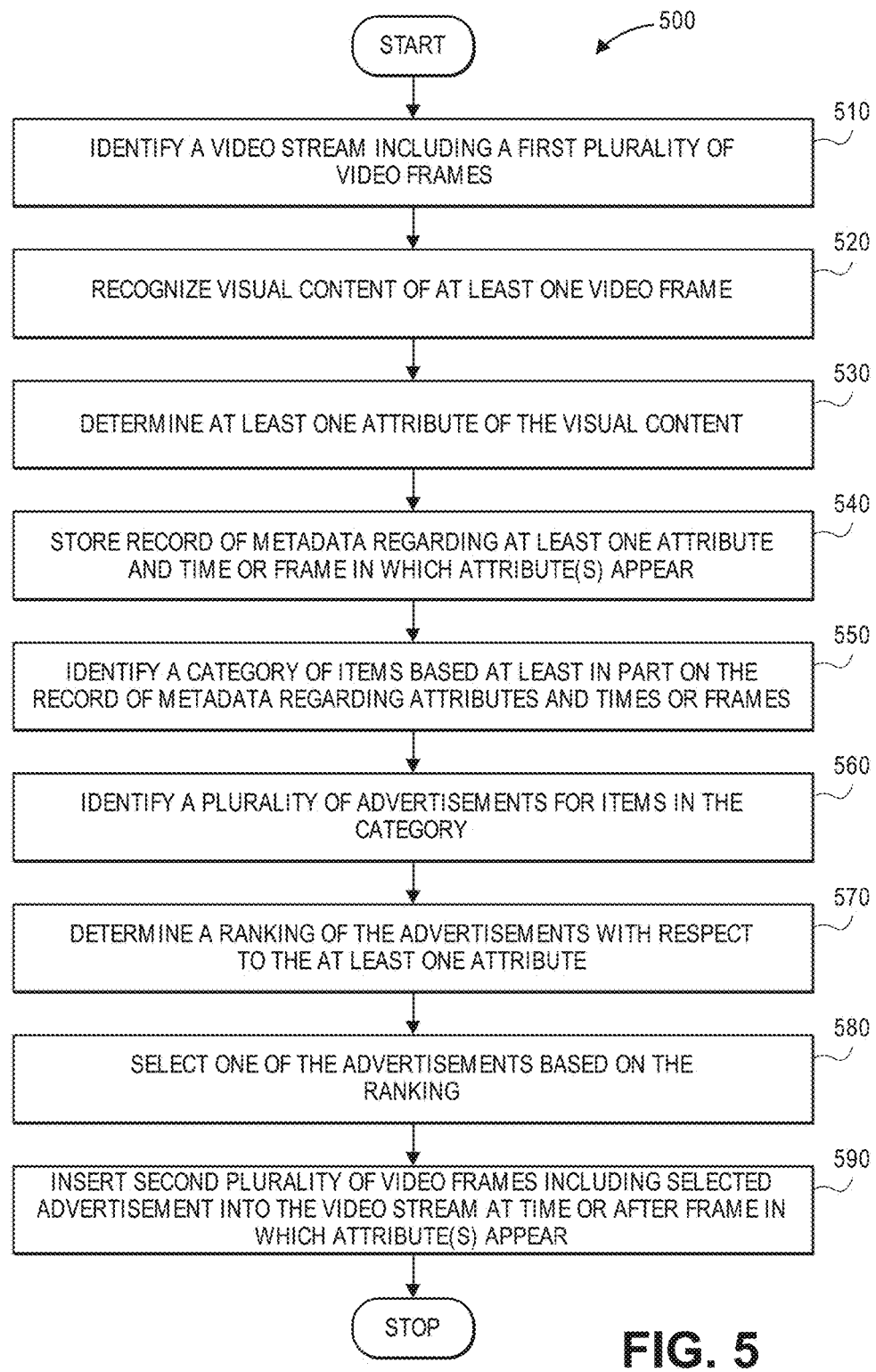
FIG. 5 is a flow chart of one process for providing content-specific video advertising in accordance with embodiments of the present disclosure.

Referring to FIG. 5, a flow chart of one process for providing content-specific video advertising in accordance with embodiments of the present disclosure is shown. At box 510, a video stream including a first plurality of video frames is identified. As is noted above, the video stream may be aired live or subject to a broadcast delay, and/or stored in one or more data stores, or otherwise maintained in any other format. At box 520, visual content of at least one of the first plurality of video frames is recognized, e.g., according to any type or form of object detection or recognition algorithms or techniques, either in real time, in near-real time, or in one or more batch processes or back-end processes.

At box 530, at least one attribute of the visual content is determined. As is noted above, the attributes may include identifiers of products or categories of products shown in the visual content, aspects of the visual content (e.g., background or foreground features) or any other information or data regarding the visual content. At box 540, a record of metadata regarding the at least one attribute of the visual content determined at box 530, and a time or a frame in which the at least one attribute appears, e.g., one or more of the video frames from which the visual content was recognized at box 520, is generated and stored in at least one data store. The record may include identifiers of products or categories of products depicted or referenced in the visual content, as well as any other information or data regarding the visual content, such as analyses of the colors and/or textures of any background or foreground features shown therein, or identities of actors, actresses, or locations of scenes, and times or frames corresponding to the at least one attribute.

At box 550, a category of items is identified based at least in part on the record of metadata regarding the attributes and the times or frames. For example, where a product is expressly identified within the record of metadata, e.g., a specific model of car or truck, then a category such as "cars" or "trucks" may be identified accordingly. Where a product is implicitly referenced within the record of metadata, e.g., with references to an auto parts dealer, a highway, or a parking space, then a specific category such as "auto parts," "highways," or "parking spaces," or a general category such as "cars" or "trucks," may be deduced from such references. Any manner for identifying an item based on the record of metadata may be used to identify the category of items in accordance with the present disclosure.

At box 560, a plurality of advertisements for items in the category are identified. For example, one or more records of attributes of existing advertisements for items may be stored in a structured form, and advertisements for items in the category may be identified from such records. Alternatively, advertisements for items in the category may be generated based at least in part on the contents of the record of metadata regarding attributes and times.

At box 570, a ranking of the plurality of advertisements with respect to the at least one visual attribute of the visual content determined at box 530 is determined. For example, advertisements for the items in the category may be ranked based on the similarity of the visual content of such advertisements to the visual content recognized at box 520. Advertisements for the items in the category may also be ranked based on their relevance to one or more viewers of the video stream, or their relevance to persons in one or more demographics of such viewers.

In some embodiments, the plurality of advertisements may be ranked according to a competitive bidding process. For example, where a video file is identified as having one or more video frames (e.g., one or more scenes) that depict or reference a sports car, manufacturers of sports cars may engage in a competitive bidding contest to have advertisements for their respective models inserted or appended into the video file, at or near the video frames in which a sports car is depicted or referenced. The ranking determined at box 570 may be a ranking of bid prices paid by the manufacturers or other marketers. Alternatively, in some embodiments, one or more marketers of goods or services that are commonly associated with sports cars, e.g., golf, yachts, motorcycles or high-end beverages, may also engage in the competitive bidding process.

In some embodiments, the determination of the ranking may also involve a calculation of a similarity score reflective of the similarity of the visual content of such advertisements to the visual content of the at least one of the plurality of video frames of the video stream. The ranking determined at box 570 may be a ranking of the similarity scores, or may consider the similarity scores as one factor in determining the ranking. Furthermore, where the ranking determined at box 570 is based on a competitive bidding process, bids associated with advertisements may be adjusted (e.g., multiplied) by the advertisements' respective similarity scores, thereby incentivizing the generation of advertisements that are similar to the visual content of the video stream.

At box 580, one of the plurality of advertisements is selected based at least in part on the ranking. For example, the selection may be strict, i.e., such that the highest-ranking advertisement is always selected. Alternatively, the selection may consider one or more other factors, such as whether the relevance of one or more highly-ranking advertisements has diminished or expired, or a frequency with which a highly-ranking advertisement has been aired. At box 590, a second plurality of video frames including the advertisement that was selected at box 580 is inserted into the video stream, at the time or after the at least one of the first plurality of video frames in which the attributes appeared, and the process ends.

Figure 6:
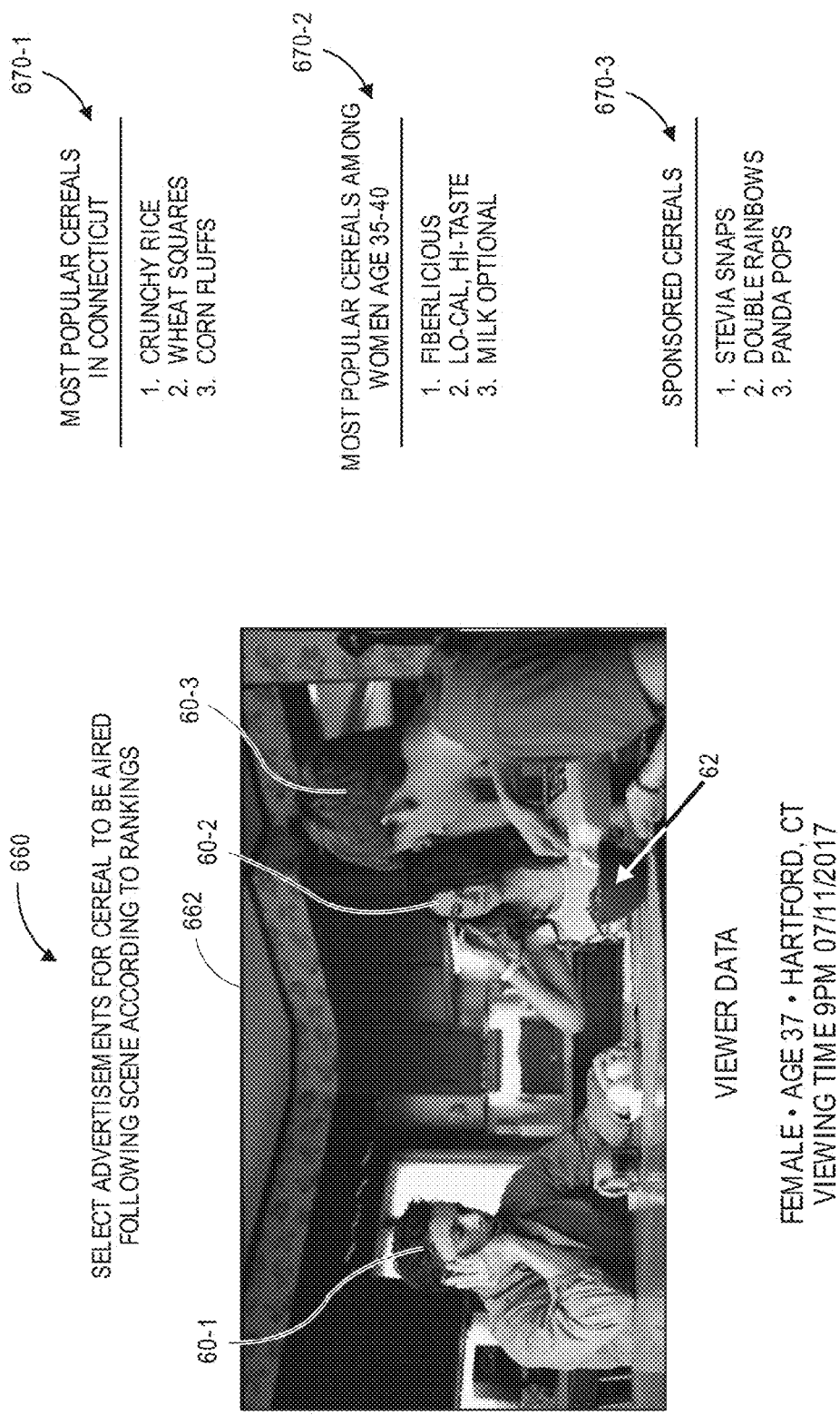
FIG. 6 is a view of aspects of one system for providing content-specific video advertising in accordance with embodiments of the present disclosure.

As is discussed above, an advertisement having visual content that is similar to visual content of a video file may be selected for insertion into the video file on any basis, including but not limited to a ranking of such advertisements. In determining a ranking of the advertisements, any intrinsic or extrinsic information or data regarding the advertisements or the video files into which the advertisements are to be inserted or appended, including but not limited to information or data regarding viewers of the video files, or premiums paid by advertisers to producers of the video files, may be considered. Referring to FIG. 6, a view of aspects of one system for providing content-specific video advertising in accordance with embodiments of the present disclosure is shown. A video file 660 including a video frame 662 is shown. The video frame 662 depicts a plurality of individuals 60-1, 60-2, 60-3 seated around a breakfast table, with one of the individuals 60-3 pouring milk into a bowl of cereal 62.

An advertisement for the cereal 62, or for other products in a category of the cereal 62 (e.g., milk, or other cereals or foods consumed in bowls, such as oatmeal or ice cream) may be identified based on a comparison of the visual content of the advertisement to the visual content of one or more video frames of the video file 660, e.g., the video frame 662. Additionally, where each of a plurality of advertisements is identified as having visual content that is similar to visual content of the video frame 662, one or more of the plurality of advertisements may be selected for insertion into the video file 660 following the video frame 662 based on one or more extrinsic or intrinsic rankings.

First, as is shown in FIG. 6, a ranking 670-1 of cereals based on their popularity in a location of the viewer may be identified, and one or more advertisements having visual content that is similar to visual content of the video frame 662 may be selected based on the ranking 670-1. Alternatively, a ranking 670-2 of cereals based on their popularity among viewers of the same gender and age group as the viewer may be identified, and one or more advertisements having visual content that is similar to visual content of the video frame 662 may be selected based on the ranking 670-2. Additionally, a ranking 670-3 of cereals based on bids or premiums paid by advertisers, e.g., sponsorship fees, may be identified, and one or more advertisements having visual content that is similar to visual content of the video frame 662 may be selected based on the ranking 670-3, namely, the amount of sponsorship fees paid by the advertisers.

Any ranking of advertisements may be identified and used to select one of a plurality of advertisements having visual content that is similar to visual content of a video file in accordance with the present disclosure, and such rankings are not limited to the geography-based, demographic-based or financially-based rankings 670-1, 670-2, 670-3 shown in FIG. 6. Moreover, as is discussed above, the rankings 670-1, 670-2, 670-3 shown in FIG. 6 may be identified where a viewer of the video file 660 is known or believed to prefer cereals, e.g., based on an express indication by the viewer, or based on information deduced or obtained from one or more external sources, such as the viewer's history of browsing information regarding items at an online marketplace, or purchasing items from the online marketplace, or any other information or data. For example, where the viewer is determined to have an interest in cellular telephones, bowls or milk, which are also depicted in the video frame 662, rankings of advertisements for such items may be determined, and one or more of the advertisements may be selected for insertion into the video file 660 following the video frame 662 based on such rankings accordingly.

As is discussed above, where one or more advertisements have been generated or identified in association with the visual content of a video file, e.g., based on one or more products or categories of products shown in one or more video frames of the video file, such advertisements may be presented to a viewer of the video file upon request. Referring to FIG. 7, a flow chart of one process for providing content-specific video advertising in accordance with embodiments of the present disclosure is shown. At box 710, a video stream including a first plurality of video frames is caused to be displayed on at least one display. For example, the video stream may be broadcasted, aired, streamed or otherwise distributed in real time or near-real time, e.g., live or subject to a broadcast delay, and displayed upon receipt by at least one personal device, such as a television, a smart phone, a tablet computer, or another similarly configured device. Alternatively, the video stream may be received from one or more transitory or non-transitory media devices, e.g., from a DVD, a USB device, or any other transitory or non-transitory memory components or data stores, including but not limited to data stores that are associated with a DVR, or another data store that may be provided in one or more alternate or virtual locations, e.g., in a "cloud"-based environment.

At box 720, a request for an advertisement is received at a first time during the display of the video stream. For example, the viewer may press one or more physical or virtual (e.g., touchscreen) buttons or other interactive features on a personal device to pause or stop a playing of the video stream, or to specifically request the advertisement. Alternatively, the viewer may verbally request the advertisement from a personal device. The personal devices that may be used to receive a request for an advertisement may include, but are not limited to, one or more televisions, set-top boxes, remote controls, mobile devices, laptop computers, desktop computers, smart speakers, smart wristwatches, or other systems that may include one or more buttons or combinations of buttons that are dedicated to such a purpose, or which may be programmed to receive one or more audible commands, e.g., an intelligent personal assistant module operating on a remote control, a smart speaker, a smart wristwatch, or another personal device.

At box 730, the display of the video stream is paused in response to the request, and at box 740, at least a first video frame of the video stream that was displayed at approximately the first time is identified. Alternatively, the display of the video stream need not be paused in order to process the request, and the display of the video stream may continue uninterrupted as the request is processed.

At box 750, at least one item depicted in the first video frame and/or at the first time is identified based at least in part on a record of metadata regarding visual content of the video stream. For example, the record of metadata may identify any information regarding the visual content of one or more of the first plurality of video frames, including but not limited to any specific products or categories of products that are depicted or referenced in such frames, and such frames may be identified with one or more tags or other metadata (e.g., identifiers). Alternatively, the at least one item depicted in the first video frame and/or at the first time may be identified by a real time or near-real time analysis of the first video frame.

At box 760, the display of one or more identifiers of advertisements for the at least one item depicted in the first video frame and/or at the first time is caused, and at box 770, a selection of one or more of the identifiers is received. For example, where the first video frame is identified as depicting at least three items for which advertisements having visual content that is similar to the visual content of the first video frames are available, identifiers of at least the three advertisements may be displayed in a window on the display on which the video stream was displayed, on a display of another personal device (e.g., a mobile device, a laptop computer, a wrist watch), or in any other manner. Alternatively, identifiers or descriptors of the advertisements or the items may be verbally announced by audio speakers of one or more personal devices, e.g., a television, a smart speaker, or another personal device.

At box 770, a selection of one of the identifiers is received. In some embodiments, the identifier must be selected in the same manner as the identifier was presented to the viewer. For example, where an identifier is displayed on a display of a personal device, the identifier must be selected by a remote control or another pointer on the display of the personal device. Where an identifier is verbally announced by one or more audio speakers of a personal device, e.g., a smart speaker, the identifier must be selected by one or more verbal commands issued to microphones associated with the personal device, e.g., the smart speaker. Alternatively, the identifier may be selected in any other manner. For example, where an identifier is displayed on a display of a personal device, the identifier may be selected by pressing one or more dedicated buttons on a personal device, or by announcing a selection via one or more verbal commands. An identifier may be selected, and the selection of the identifier may be received, in any manner in accordance with the present disclosure.

At box 780, an advertisement associated with the selected identifier is displayed on the at least one display. In some embodiments, such as where the visual content of leading video frames of the advertisement associated with the selected identifier are specifically designed to mimic or closely correspond to the visual content of the video stream, the display of the advertisement may begin without any form of transition or other delay. In some other embodiments, such as where the visual content of the leading frames of the advertisement do not mimic or correspond to the visual content of the video stream, the advertisement may be displayed following a "fade-to-black" and "fade-from-black" or other transition.

At box 790, the display of the video stream is resumed following the display of the advertisement, and the process ends. For example, where the trailing video frames of the advertisement are specifically designed to mimic or closely correspond to the visual content of the video stream, the display of the video stream may begin without any form of transition or other delay. In some embodiments, such as where the visual content of the leading frames of the advertisement do not mimic or correspond to the visual content of the video stream, the advertisement may be displayed following a "fade-to-black" and "fade-from-black" or other transition.

As is discussed above, any number or type of personal devices may be used to view and/or interact with video files.

Figure 8B:
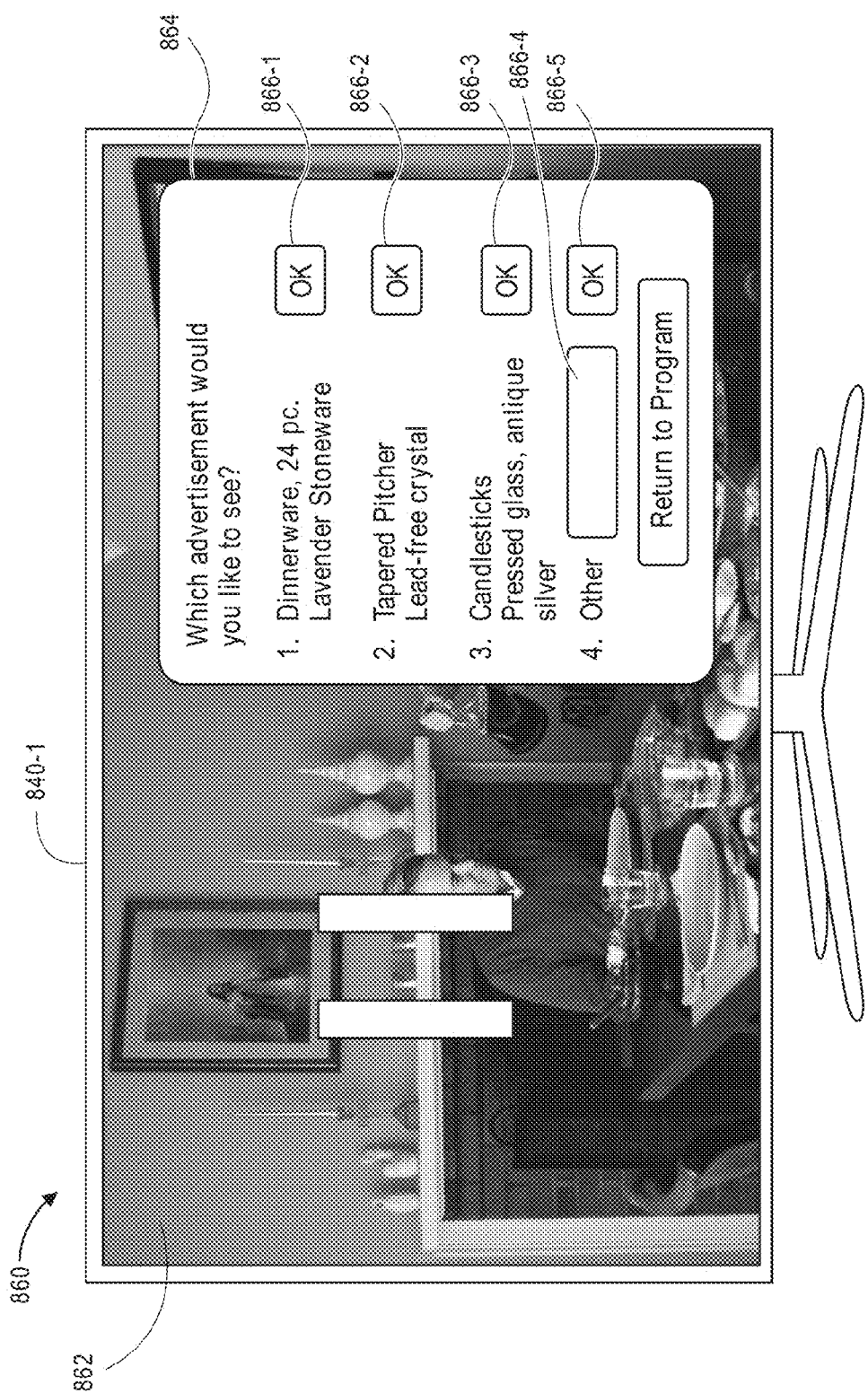

Such personal devices may be used to make requests for advertisements associated with the visual content of such video files, to select advertisements in response to such requests, or to take any other actions in association with video files or advertisements. Referring to FIGS. 8A and 8B, views of aspects of one system for providing content-specific video advertising in accordance with embodiments of the present disclosure are shown.

As is shown in FIG. 8A, a video file 860 having a video frame 862 is displayed by a personal device, e.g., a television 840-1. The video frame 862 depicts a plurality of individuals 80-1, 80-2, 80-3 who are preparing to enjoy a meal in a setting that includes plates and dishes 82-1, a clear pitcher 82-2, and candlesticks 82-3 on a mantle. A plurality of other personal devices 840-2, 840-3, 840-4, including a smart speaker 840-2, a smartphone 840-3 and a remote control 840-4, are also shown.

In accordance with the present disclosure, viewers of the video file 860 may request advertisements for one or more items shown in the video frame 862, or other video frames of the video file 860, in any number of ways. For example, the television 840-1 may include one or more buttons or other features for receiving instructions to pause or stop the playing of the video file 860, or for requesting advertisements for items depicted or referenced in the video file 860. In some embodiments, such buttons or other features may be provided on a console of the television 840-1. In other embodiments, such buttons or other features may be displayed on a screen of the television 840-1. Alternatively, the television 840-1 may be outfitted with one or more microphones for receiving audible instructions or requests for advertisements for items depicted or referenced in the video file 860.

Similarly, the smart speaker 840-2, the mobile device 840-3 and/or the remote control 840-4 may also be configured to receive audible instructions to pause or stop the playing of the video file 860, or audible requests for advertisements for items depicted or referenced therein. The mobile device 840-3 and the remote control 840-4 may also include one or more buttons or other features for receiving instructions or requests for advertisements for items depicted or referenced in the video file 860. For example, the mobile device 840-3 may execute one or more software applications operating thereon, which may cause one or more buttons or other interactive features to be rendered on a touchscreen display, while the remote control 840-4 may include one or more dedicated buttons. One or more of such buttons, or combinations of such buttons, may be selected to cause the playing of the video file 860 to pause or stop, or to request one or more advertisements for items depicted or referenced in the video file 860.

As is shown in FIG. 8B, after the playing of the video file 860 has been paused or stopped, or after a request for advertisements has been received, e.g., by way of one or more of the personal devices 840-1, 840-2, 840-3, 840-4, a window 864 comprising links, identifiers or other references to advertisements is displayed on the television 840-1. For example, a viewer may request an advertisement for the plates and dishes 82-1 by selecting a button 866-1 shown on the television 840-1. A viewer may also request advertisements for the pitcher 82-2 or the candlesticks 82-3 by selecting one of the buttons 866-2, 866-3 shown on the television 840-1. Additionally, a viewer may also request an advertisement for items other than the plates and dishes 82-1, the pitcher 82-2 or the candlesticks 82-3 by entering one or more identifiers (e.g., alphanumeric characters) of such items into a text box 866-4 and by selecting a button 866-5. In some embodiments, the identifiers may be entered verbally, e.g., by one or more audible instructions, or in any other manner by way of the television 840-1, the smart speaker 840-2, the mobile device 840-3 and/or the remote control 840-4, such as by operating a pointer or activating one or more buttons associated with such characters.

In the event that advertisements for one or more of the plates and dishes 82-1, the pitcher 82-2 or the candlesticks 82-3 are selected, such advertisements may begin to be displayed immediately following the selection. After the advertisements have been displayed, the playing of the video file 860 may resume immediately thereafter. Alternatively, one or more other advertisements may be requested, or any other action associated with the video file 860 or the television 840-1 may be taken accordingly. For example, the advertisements may be displayed as the video program is paused, or concurrently with or in lieu of a portion of the video program, e.g., overlaying the portion of the video program, or in an inset during the playing of the portion of the video program.

Figure 9:
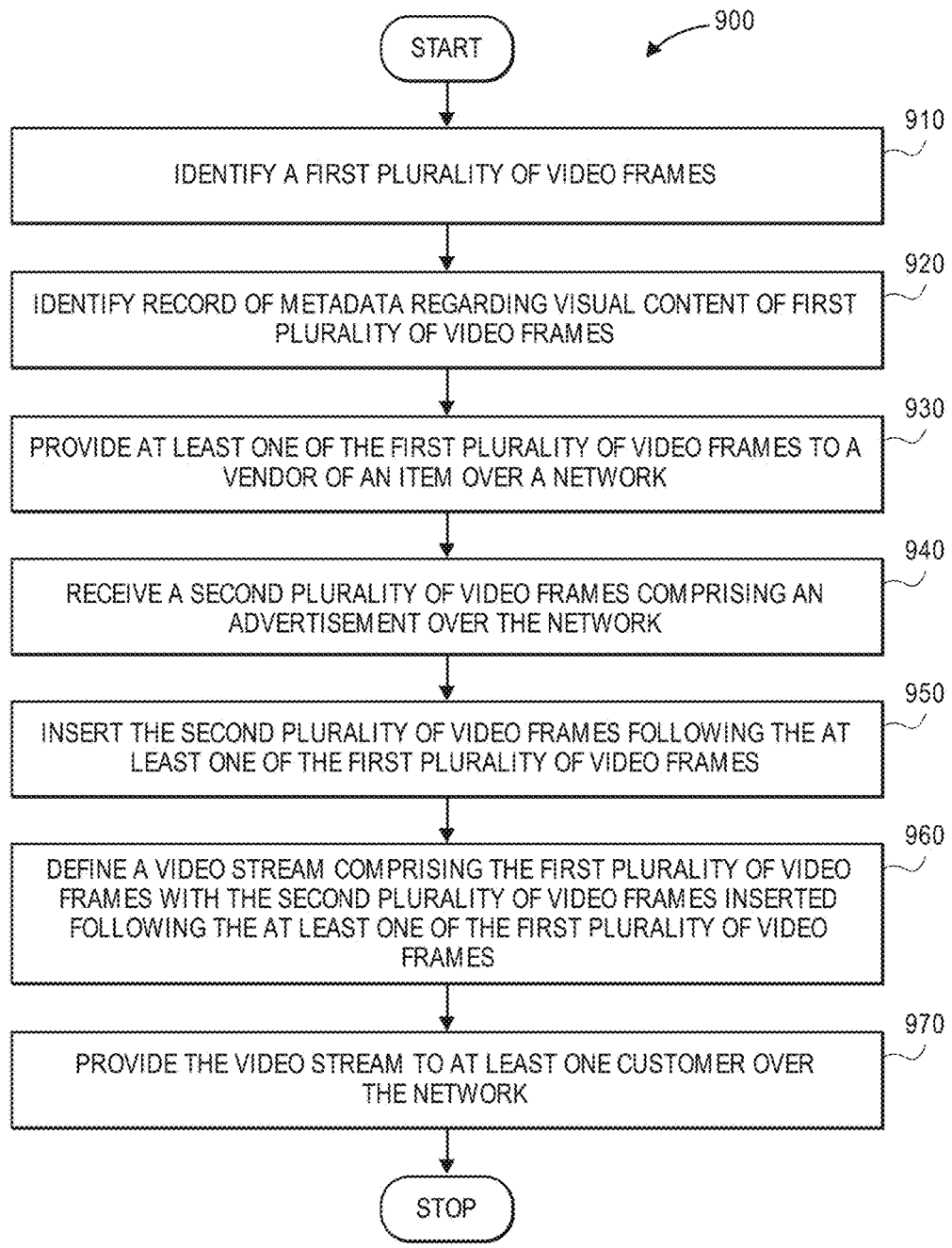
FIG. 9 is a flow chart of one process for providing content-specific video advertising in accordance with embodiments of the present disclosure.

As is discussed above, in some embodiments, portions of a video file (e.g., one or more video frames) may be provided to manufacturers or marketers of items, or other advertisers, to enable such entities to generate native advertisements having visual content that matches or most closely mimics the visual content of the video file, thereby enabling the advertisements to be seamlessly inserted or appended into the video file with minimal disruption to a viewer's experience. Referring to FIG. 9, a flow chart of one process for providing content-specific video advertising in accordance with embodiments of the present disclosure is shown. At box 910, a first plurality of video frames is identified. The first plurality of video frames may be identified in a static format, e.g., in one or more data stores, or, alternatively, as the video frames are broadcasted, aired, streamed or otherwise distributed to viewers.

At box 920, a record of metadata regarding the visual content of the first plurality of video frames is identified. For example, the record of metadata may identify any information regarding the visual content of one or more of the first plurality of video frames, including but not limited to any specific products or categories of products that are depicted or referenced in such frames, as well as times at which such products or categories are depicted or referenced, or specific frames in which such products or categories are depicted or referenced. Such times or frames may be identified with one or more tags or other metadata (e.g., identifiers). The record of metadata may also include one or more descriptors of the visual content of such video frames, e.g., colors, textures, or other identifiers. The record of metadata may be stored in a structured format that may be accessed over one or more networks, e.g., by producers of video content, including but not limited to video programming and/or advertising.

At box 930, at least one of the first plurality of video frames and a portion of the record is provided to a vendor of an item over a network. The video frames and the portion of the record may be provided to the vendor via standard channels, such as by electronic mail, file transfer protocol (FTP), cloud drives, or any other technique for network-based file sharing, or in any other manner, e.g., using one or more Universal Serial Bus ("USB") drives or DVDs. The vendor may use the video frames and the record to generate one or more advertisements for one or more items. In some embodiments, based on the video frames and/or the record, the vendor may identify a scene shown in the video file that depicts one or more of the items that the vendor offers for sale, e.g., or an item in a category of items that the vendor offers for sale. For example, where a vendor offers baseball bats and baseball gloves for sale, the vendor may identify a scene of the video file in which baseball is played, and may generate an advertisement for its baseball bats and baseball gloves at the same location where the baseball scene was filmed, or at a similar setting, and under the same or similar lighting and weather conditions as the baseball scene. Moreover, in some embodiments, the vendor may attempt to contact one or more of the same actors or actresses that appeared in the baseball scene, and may contract with such actors or actresses to also appear in the advertisement. The newly generated scene may then be inserted or appended into the video file, e.g., following the at least one of the first plurality of video frames. Alternatively, the at least one of the video frames may be provided to the vendor, without any record of the metadata, and the vendor may independently process the at least one of the video frames to identify information or data regarding items depicted or referenced therein.

In some embodiments, the vendor may also identify a scene shown in the video file that references one or more items that the vendor offers for sale, or items in a category of items that the vendor offers for sale. For example, where a vendor offers beach towels, beach toys and sunscreen for sale, the vendor may identify a scene of the video file in which events take place at a beach, or in which sunshine is bright and prominent. The vendor may then generate an advertisement for its beach towels, beach toys or sunscreen at the same location where the beach scene was filmed, or at a similar setting, and under the same or similar lighting and weather conditions as the beach scene. The vendor may also attempt to contact one or more of the same actors or actresses that appeared in the beach scene, and may contract with such actors or actresses to also appear in the advertisement. The newly generated scene may then be inserted or appended into the video file, e.g., following the at least one of the first plurality of video frames.

Alternatively, the vendor may modify one or more existing advertisements based on the video frames and/or the record. For example, rather than filming a new advertisement at the same setting as a scene in the video file, at a similar setting, or under the same or similar lighting or weather conditions, one or more leading or trailing frames of an existing advertisement may be modified to coincide or correspond with a scene in the video file, thereby enabling the modified existing advertisement to be inserted or appended into the video file after the scene.

At box 940, a second plurality of video frames comprising an advertisement is received over the network. The second plurality of video frames may be received from the vendor, or from a video advertisement agency contracted by the vendor, or from any other source. At box 950, the second plurality of video frames is inserted following the at least one of the first plurality of video frames. For example, the first plurality of video frames may be partitioned into two or more parts, e.g., by inserting a break after the at least one of the first plurality of video frames, and the second plurality of video frames may be inserted into the break. At box 960, a video stream comprising the first plurality of video frames with the second plurality of video frames inserted following the at least one of the first plurality of video frames is defined. For example, a modified video file including the partitioned first plurality of video frames, and the second plurality of video frames inserted therebetween, may be generated and stored in at least one data store. At box 970, the video stream is provided to at least one customer over the network, e.g., by broadcasting, airing, streaming or otherwise distributing the video stream, and the process ends.

Figure 10A:
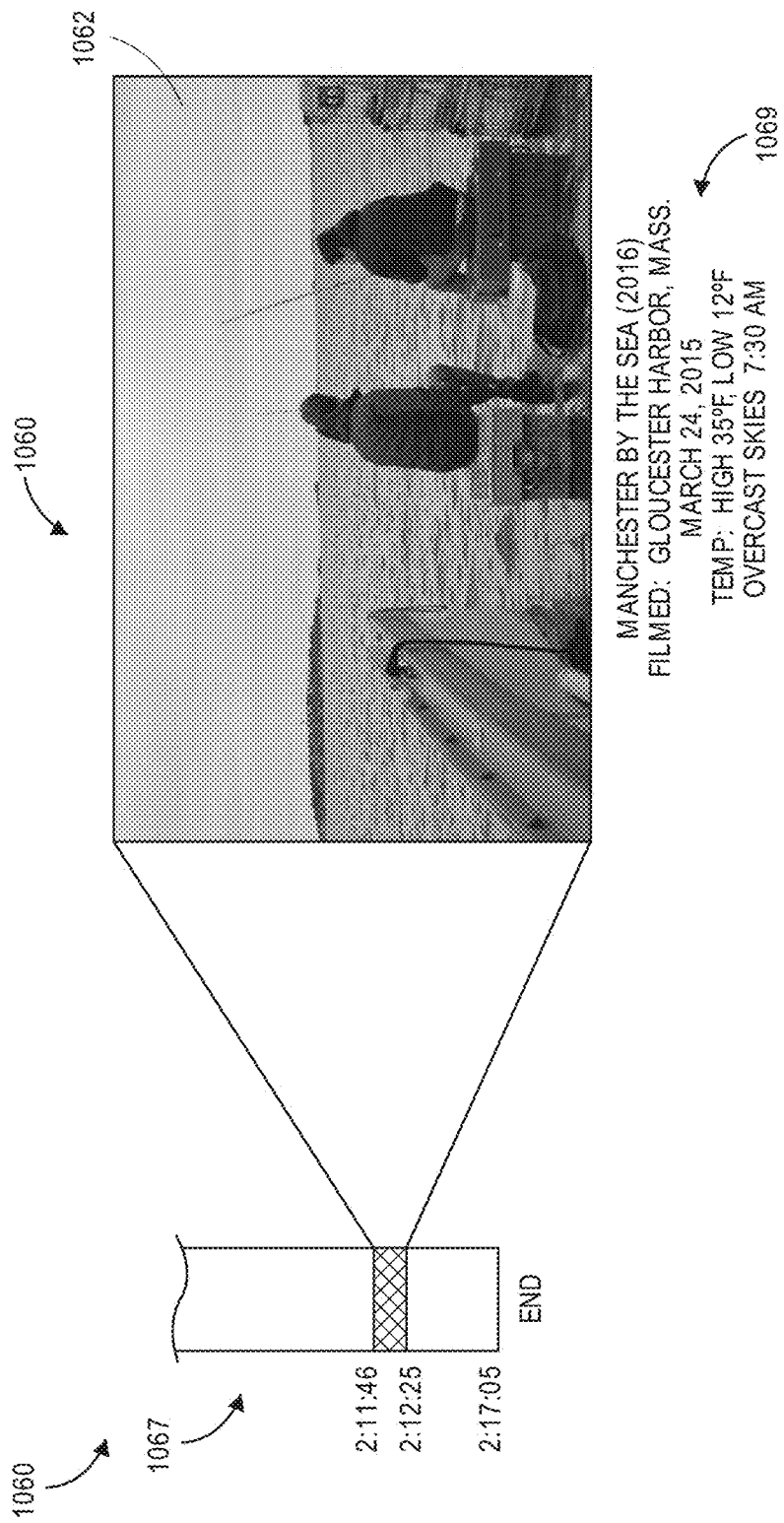
FIGS. 10A, 10B and 10C are views of aspects of one system for providing content-specific video advertising in accordance with embodiments of the present disclosure.
Figure 10B:
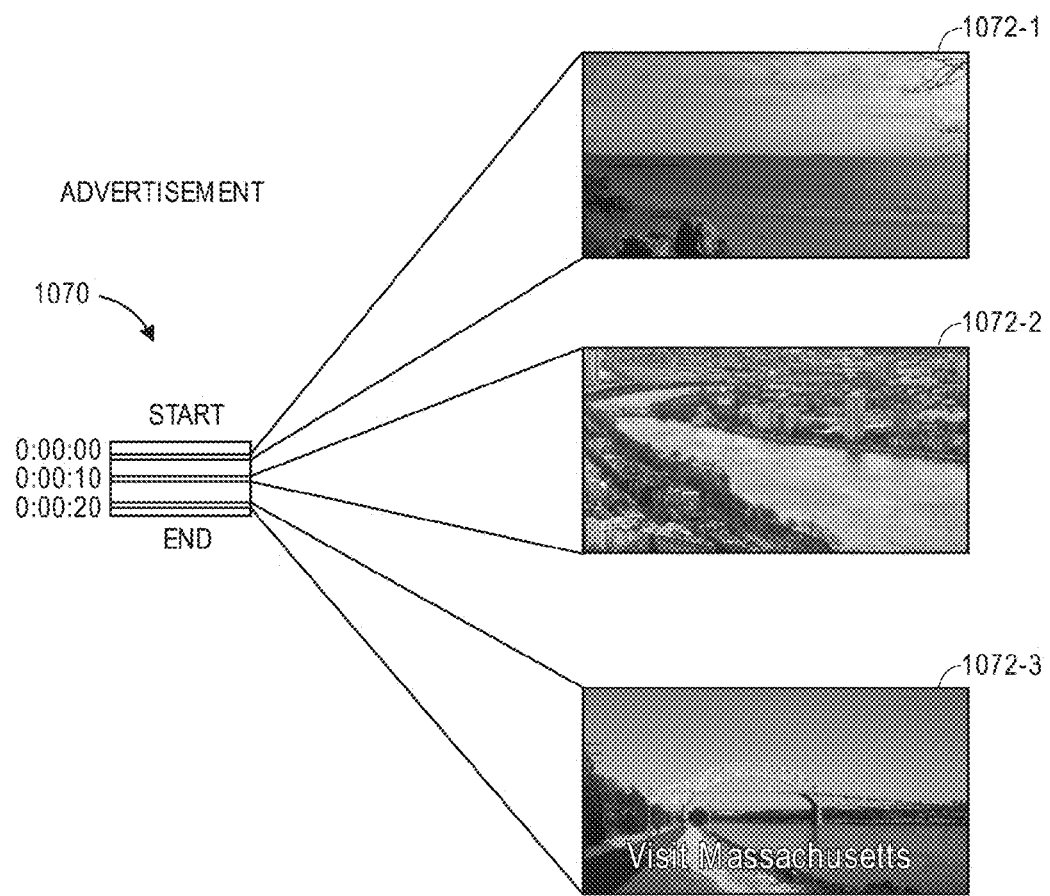
Figure 10C:
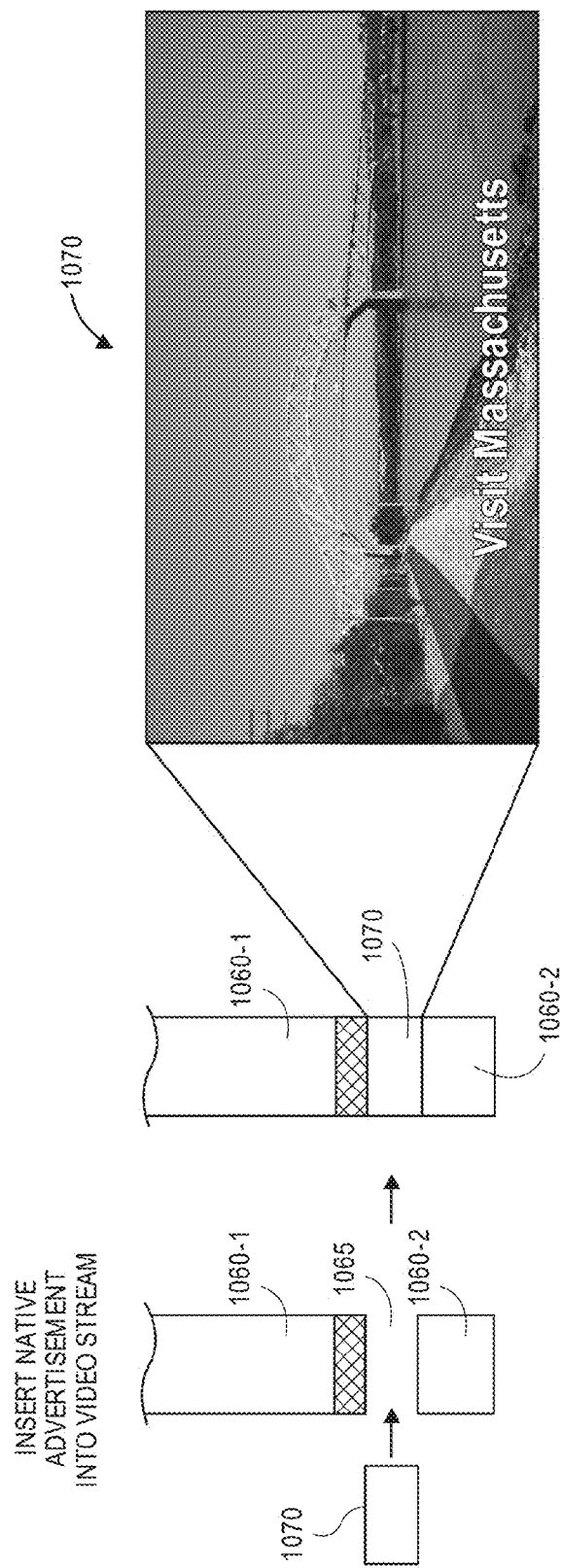

Referring to FIGS. 10A, 10B and 10C, views of aspects of one system for providing content-specific video advertising in accordance with embodiments of the present disclosure are shown. As is shown in FIG. 10A, a portion 1067 of a video file 1060 is shown. The portion 1067 of the video file 1060 includes video frames, such as a video file 1062, from a scene that occurs between two hours, eleven minutes and forty-six seconds of the video file 1060, and two hours, twelve minutes and twenty-five seconds, of the video file 1060. As is also shown in FIG. 10A, metadata 1069 regarding the portion 1067 of the video file 1060 includes an identifier of the video file 1060, as well as a location at which the portion 1067 of the video file 1060 was filmed, a date on which the portion 1067 of the video file 1060 was filmed, information regarding whether conditions when the portion 1067 of the video file 1060 was filmed, and a time at which the portion 1067 of the video file 1060 was filmed.

As is discussed above, portions of a video file may be provided to producers of video advertising, along with metadata regarding such portions, and a video advertisement for inclusion in the video file may be generated based on the visual content of the portions of the video file and the metadata associated with the portions. As is shown in FIG. 10B, an advertisement 1070 that is twenty seconds in duration and includes a plurality of video frames 1072-1, 1072-2, 1072-3 may be generated based on the portion 1067 of the video file 1060 and the metadata 1069. More specifically, as is shown in FIG. 10B, whereas the metadata 1069 indicates that the portion 1067 of the video file 1060 was filmed in Massachusetts during the early spring, and in wintry conditions, the video frames 1072-1, 1072-2, 1072-3 depict views of similar portions of Massachusetts that were captured at similar times and under similar weather conditions. For example, the video frame 1072-1 depicts a view of the Massachusetts coastline, while the video frame 1072-2 depicts an aerial view of portions of Boston, Cambridge and the Charles River, and the video frame 1072-3 shows the Bourne Bridge, which spans the Cape Cod Canal, during the winter.

As is shown in FIG. 10C, the advertisement 1070 may be inserted or appended into the video file 1060 following the portion 1067 of the video file 1060 that was provided to the producers of the advertisement. For example, a break 1065 may be inserted or appended into the video file 1060 immediately after the two hour, twelve minute and twenty-five second mark, thereby partitioning the video file 1060 into two parts 1060-1, 1060-2, and the advertisement 1070 may be inserted or appended into the break 1065. With respect to the visual content of the video file 1060, including but not limited to the visual content of the video frame 1062, the advertisement 1070 thus appears to be native, or visually consistent with the portion 1067, e.g., as if the advertisement 1070 was originally included in the video file 1060.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments described herein or shown in the accompanying figures refer to the selection or airing of advertisements during a movie, the systems and methods disclosed herein are not so limited. One or more embodiments may be utilized in association with any scheme for selecting and/or inserting or appending advertisements into video programming, including but not limited to any advertisement auctioning or bidding system that enables advertisers to bid or purchase slots of advertising during one or more video programs. Moreover, "on demand" advertisements, such as those shown in FIG. 8B, may be incorporated into any aspect of the playing of video files, such as when a viewer elects to pause or stop the playing. One or more prompts, windows or other features that enable the viewer to select and view one or more advertisements may be presented each time that the viewer pauses or stops a video file. Moreover, one or more of the systems and methods disclosed herein may also be utilized in connection with the placement of products within video programs prior to filming, or in connection with the evaluation of user-generated content or crowdsourced videos (e.g., videos hosted on network sites and/or other social media platforms), to identify items that are visually relevant to the visual content of such programs, or to select advertisements for such items that are also visually relevant.

Likewise, although some of the embodiments described herein or shown in the accompanying figures refer to the display of video files on televisions, the systems and methods disclosed herein are not so limited, and video content may be displayed on any type or form of personal device, including but not limited to computers, telephones or any other devices having one or more displays and, optionally, audio speakers.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3, 5, 7 or 9, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit(s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A video system comprising:
  a server having at least one data store and at least one computer processor, wherein the server is connected to one or more networks, wherein the at least one data store has instructions stored thereon that, when executed by the at least one computer processor, cause the server to perform a method comprising:
   transmitting a first video stream for display by a television over the one or more networks, wherein the first video stream comprises a first plurality of video frames;
   receiving a request for an advertisement by a viewer of the video stream, wherein the request was entered by the viewer via at least one personal device;
   in response to the request,
      determining at least one of a first time at which the request was entered or a first video frame displayed on the television at the first time, wherein the first video frame is one of the first plurality of video frames; and
      after the first time,
         identifying at least a first item displayed on the television at the first time or depicted in the first video frame;
         detecting at least one of a first edge, a first contour, a first outline, a first color, a first texture, a first silhouette, or a first shape depicted in the first video frame;
         selecting a second video stream comprising a second plurality of video frames, wherein the second video stream includes a first advertisement of the first item, wherein at least one of a second edge, a second contour, a second outline, a second color, a second texture, a second silhouette or a second shape depicted in at least a second video frame is similar to the at least one of the first edge, the first contour, the first outline, the first color, the first texture, the first silhouette or the first shape depicted in the first video frame, and wherein the second video frame is one of the second plurality of video frames; and
         transmitting the second video stream for display by the television over the one or more networks.

2. The video system of claim 1, wherein identifying at least the first item displayed on the television at the first time or depicted in the first video frame further comprises:
   after the first time,
      identifying a second item displayed on the television at the first time or depicted in the first video frame;
      transmitting a third video stream for display by the television over the one or more networks, wherein the third video stream includes a third plurality of video frames, and wherein the third video stream includes a menu comprising a first identifier of the first item and a second identifier of the second item; and
      receiving a selection of the first identifier over the one or more networks,
      wherein the second video stream is transmitted for display by the television over the one or more networks in response to the selection.

3. The video system of claim 1,
   wherein the first item is identified based at least in part on the at least one of the first edge, the first contour, the first outline, the first color, the first texture, the first silhouette or the first shape.

4. A computer-implemented method comprising:
   causing a display of at least a portion of a first video file on a display of at least one personal device, wherein the first video file comprises a first plurality of video frames;
   receiving a request for at least one advertisement over at least one communications network from a viewer of the display of at least the first video file at a first time, wherein the request is received during the display of at least the first video file;
   identifying at least one product depicted in at least one of the first plurality of video frames displayed on the display of the at least one personal device at or prior to the first time, wherein the at least one product is identified not earlier than the first time; and
   causing a display of a second video file on the display of the at least one personal device at a second time, wherein the second video file comprises a second plurality of video frames, wherein the second video file contains an advertisement associated with the at least one product, and wherein the second time is later than the first time.

5. The computer-implemented method of claim 4, wherein identifying the at least one product depicted in the at least one of the first plurality of video frames displayed on the display of the at least one personal device at or prior to the first time comprises:
   in response to the request,
      identifying a first product based at least in part on the request not earlier than the first time; and
      selecting a video file comprising an advertisement for the first product, wherein the second video file is the selected video file.

6. The computer-implemented method of claim 4, wherein identifying the at least one product depicted in the at least one of the first plurality of video frames displayed on the display of the at least one personal device at or prior to the first time comprises:
   accessing a record of metadata associated with the first video file, wherein the record of metadata comprises at least one identifier of at least one product and at least one identifier of at least one video frame in which the at least one product is depicted or at least one time at which the at least one product is depicted; and
   identifying the at least one product depicted in a first video frame of the first plurality of video frames or at the first time based at least in part on the record of metadata in response to the request,
   wherein the first video frame is displayed at or prior to the first time.

7. The computer-implemented method of claim 4, wherein identifying the at least one product depicted in the at least one of the first plurality of video frames displayed on the display of the at least one personal device at or prior to the first time comprises:
   not earlier than the first time,
      detecting at least one of a first edge, a first contour, a first outline, a first color, a first texture, a first silhouette or a first shape within the at least one of the first plurality of video frames displayed on the display of the at least one personal device at or prior to the first time; and
      identifying the at least one product based at least in part on the first edge, the first contour, the first outline, the first color, the first texture, the first silhouette or the first shape.

8. The computer-implemented method of claim 7, further comprising:
identifying a plurality of video files, wherein each of the plurality of video files comprises at least one advertisement associated with the at least one product; and
selecting one of the plurality of video files based at least in part on the first edge, the first contour, the first outline, the first color, the first texture, the first silhouette or the first shape,
wherein the second video file is the selected one of the plurality of video files.

9. The computer-implemented method of claim 4, wherein identifying the at least one product depicted in the at least one of the first plurality of video frames displayed on the display of the at least one personal device at or prior to the first time comprises:
identifying a plurality of products depicted in the at least one of the first plurality of video frames displayed on the display of the at least one personal device at or prior to the first time, and
wherein the method further comprises:
causing a display of a menu comprising a plurality of identifiers on the display of the at least one personal device, wherein each of the plurality of products is associated with one of the plurality of identifiers;
receiving a selection of one of the plurality of identifiers over the at least one communications network from the viewer;
identifying the one of the products associated with the selected one of the plurality of identifiers; and
in response to identifying the one of the products associated with the selected one of the plurality of identifiers,
selecting one of a plurality of video files comprising an advertisement for the one of the products associated with the selected one of the plurality of identifiers,
wherein the second video file is the selected one of the plurality of video files, and
wherein the display of the second video file is caused in response to the selection of the one of the plurality of video files.

10. The computer-implemented method of claim 9, further comprising:
performing an analysis of visual content of the at least one of the first plurality of video frames;
performing the analysis of the visual content of at least one video frame of each of the plurality of video files; and
calculating, for each of the plurality of video files, a similarity score based at least in part on the analysis of the visual content of the at least one of the first plurality of video frames and the analysis of the visual content of the at least one video frame of each of the plurality of video files,
wherein the one of the plurality of video files is selected based at least in part on the similarity score.

11. The computer-implemented method of claim 4, wherein receiving the request for the at least one advertisement over the at least one communications network from the viewer comprises at least one of:
receiving at least one audible signal from the viewer via the at least one personal device, wherein the at least one audible signal comprises the request.

12. The computer-implemented method of claim 4, wherein causing the display of at least the first video file on the display of the at least one personal device comprises:

causing the display of at least the first video file on the display of a first personal device,
wherein the request for the at least one advertisement is received over the at least one communications network from at least one of:
the first personal device; or
a second personal device, and
wherein the second personal device is one of:
a smart speaker;
a remote control associated with the first personal device; or
a mobile computer device.

13. The computer-implemented method of claim 4, wherein causing the display of at least the first video file by the at least one personal device comprises:
transmitting at least the first video file to the at least one personal device over the at least one communications network prior to the first time, and
wherein causing the display of the second video file by the at least one personal device comprises:
transmitting the second video file to the at least one personal device over the at least one communications network after the first time.

14. The computer-implemented method of claim 13, wherein the at least one communications network comprises one of:
a cable television network; or
a computer network.

15. The computer-implemented method of claim 4, wherein identifying the at least one product depicted in the at least one of the first plurality of video frames displayed on the display of the at least one personal device at or prior to the first time comprises:
identifying a first product depicted in the at least one of the first plurality of video frames displayed on the display of the at least one personal device at or prior to the first time;
determining that the first product is in a category of products;
selecting a second product, wherein the second product is in the category of products; and
selecting one of a plurality of video files, wherein each of the plurality of video files comprises an advertisement for the second product, and
wherein the second video file is the selected one of the plurality of video files.

16. The computer-implemented method of claim 15, determining at least one attribute of the viewer based at least in part on at least one of:
a browsing history of the first viewer at an online marketplace;
a purchasing history of the first viewer at the online marketplace; or
the request for the at least one advertisement received from the viewer,
wherein at least one of the second product or the one of the plurality of video files is selected based at least in part on the at least one attribute of the viewer.

17. The computer-implemented method of claim 15, further comprising:
receiving information regarding a plurality of bids over the at least one communications network, wherein each of the bids is a sum of money offered as consideration to cause a display of one of the plurality of video files in response to requests for at least one advertisement;
determining a ranking of at least some of the plurality of video files; and selecting the one of the plurality of video files based at least in part on the ranking.

18. A computer-implemented method comprising:
   identifying a first video file comprising a first plurality of video frames;
   conducting an object recognition analysis of at least some of the first plurality of video frames;
   generating a record based at least in part on the object recognition analysis, wherein the record comprises a plurality of products identified during the object recognition analysis and at least one frame in which each of the plurality of products was identified;
   causing the first video file to be transmitted to a first personal device of a first user over at least one computer network;
   receive a request for an advertisement from the first user over the at least one computer network, wherein the request for the advertisement is received as a first video frame of the first plurality of video frames is shown on a display of the first personal device, and wherein the request is received via at least one of the first personal device or a second personal device of the first user;
   in response to the request,
      identifying, based at least in part on the record, a plurality of items depicted in the first video frame;
      causing a display of a window on the display of the first personal device over the at least one computer network, wherein the window comprises identifiers of at least some of the plurality of items depicted in the first video frame;
      receiving a selection of one of the identifiers from the first user over the at least one computer network, wherein the selection is received via at least one of the first personal device or the second personal device;
      identifying a second video file based at least in part on the selection of the one of the identifiers, wherein the second video file comprises an advertisement for the one of the plurality of items associated with the selected one of the identifiers; and
      causing the second video file to be transmitted to the first personal device over the at least one computer network.

19. The computer-implemented method of claim 18, wherein the first personal device is one of a television, a media player, a desktop computer, a laptop computer, a tablet computer or a smartphone, and
   wherein the second personal device is one of:
      a smart speaker;
      a remote control associated with the first personal device; or
      a mobile device.

20. The computer-implemented method of claim 18, further comprising:
   determining at least one of a color or a texture of at least one of a first background feature or a first foreground feature depicted in the first video frame; and
   identifying the second video file based at least in part on the color or the texture,
   wherein the second video file depicts at least one of a second background feature or a second foreground feature having the at least one of the color or the texture.

* * * * *